(12) United States Patent
Visscher

(10) Patent No.: US 8,439,152 B2
(45) Date of Patent: May 14, 2013

(54) VEHICLE DRIVE TRANSMISSION AND STEERING SYSTEM

(75) Inventor: Peter Derek Visscher, Lakeside (CA)

(73) Assignee: Ontario Drive & Gear Limited, New Hamburg, Ontario (CA)

(*) Notice: Subject to any disclaimer, the term of this patent is extended or adjusted under 35 U.S.C. 154(b) by 131 days.

(21) Appl. No.: 12/851,662

(22) Filed: Aug. 6, 2010

(65) Prior Publication Data

US 2011/0217887 A1 Sep. 8, 2011

(30) Foreign Application Priority Data

Aug. 10, 2009 (GB) .................................. 0913929.6

(51) Int. Cl.
*B62D 5/04* (2006.01)
*F16H 55/18* (2006.01)

(52) U.S. Cl.
USPC ............................................ 180/444; 74/409

(58) Field of Classification Search .................. 180/6.2, 180/6.24, 6.44; 475/18.28, 248, 207; 440/12.5
See application file for complete search history.

(56) References Cited

U.S. PATENT DOCUMENTS

| | | | |
|---|---|---|---|
| 2,946,239 A | 7/1960 | Hait | |
| 3,260,134 A | 7/1966 | Bowen et al. | |
| 3,377,885 A | 4/1968 | Tuck et al. | |
| 4,377,094 A * | 3/1983 | Thompson et al. | 475/27 |
| 4,471,669 A | 9/1984 | Seaberg | |
| 4,617,836 A | 10/1986 | Baldwin | |
| 4,738,161 A | 4/1988 | Ivy | |
| 4,882,947 A * | 11/1989 | Barnard | 475/23 |
| 4,977,970 A | 12/1990 | Steiger | |
| 5,004,060 A | 4/1991 | Barbagli et al. | |
| 6,454,031 B2 * | 9/2002 | Szymkowiak | 180/6.2 |
| 7,326,141 B2 * | 2/2008 | Lyons et al. | 475/28 |
| 2006/0089227 A1 * | 4/2006 | Fanselow et al. | 475/248 |
| 2007/0213160 A1 * | 9/2007 | Lyons et al. | 475/5 |
| 2008/0300084 A1 * | 12/2008 | Thompson | 475/150 |
| 2009/0124142 A1 * | 5/2009 | Wernicke et al. | 440/12.63 |

FOREIGN PATENT DOCUMENTS

| | | |
|---|---|---|
| GB | 567635 | 12/1940 |
| GB | 1112268 | 8/1968 |
| WO | WO87/05574 | 9/1987 |

OTHER PUBLICATIONS

Epicyclic gearing, Wikipedia encyclopedia.

* cited by examiner

Primary Examiner — Tony H. Winner
Assistant Examiner — Jacob Knutson
(74) Attorney, Agent, or Firm — Anthony Asquith Corp.

(57) ABSTRACT

On an amphibious ATV, a triple-differential transmission is combined a continuously-variable drive. The gearbox can be set at a low ratio, for negotiation of difficult terrain, and at a high ratio for cruising trails. The high-low shift mechanism is located upstream, in the drive train, of the forward-reverse shift mechanism. Both mechanisms are located upstream of the steer-differential and of the two wheel-differentials. Main power from the engine is passed, through the mechanisms, directly to a wheel-ring that is common to both wheel-differentials. The common wheel-ring is bearing'd, not from the gearbox housing, but from the wheel-shafts, which are themselves bearing'd into the gearbox housing. Similarly, the steer-diff-housing is bearing'd, not from the gearbox housing, but from the steer-shafts, which are themselves bearing'd from the gearbox housing, which makes for a compact, narrow, layout of the gearbox—well suited to the ATV. The steer-brake-disks are located on the steer-shafts, and are positioned outside the gearbox housing.

19 Claims, 10 Drawing Sheets

(Unsteered, HIGH)

(Unsteered, LOW)

(Steered, HIGH)

(Steered, LOW)

VEHICLE DRIVE TRANSMISSION AND STEERING SYSTEM

This invention relates to a power transmission and steering system, and especially to a system of the kind used in all-terrain vehicles (ATVs), including amphibious vehicles, in which two or more left wheels are constrained to rotate in unison, and two or more right wheels are constrained to rotate in unison. The wheels on one side are connected together e.g by a chain drive, or e.g by a track that encloses the wheels.

One of the traditional ways in which steering on such vehicles is accomplished is by skid-steering, in which, to accomplish a turn to the left, the wheels on the left side are braked while drive power is transmitted to the wheels on the right.

Skid-steering is notoriously clumsy and inefficient, and one of the aims of the present invention is to provide improved steering sensitivity and to avoid much of the waste of energy that is inherent in traditional skid-steering. The invention makes use of a triple-differential arrangement, which is known per se, but is set up in a cost-effective and efficient manner that is well suited to the application.

An example of the new technology will be described with reference to the accompanying drawings, in which:—

FIG. 1 includes information about the numbers of teeth on the gears.

In FIG. 1a, the vehicle is performing unsteered motion in HIGH mode.

Figure 1:
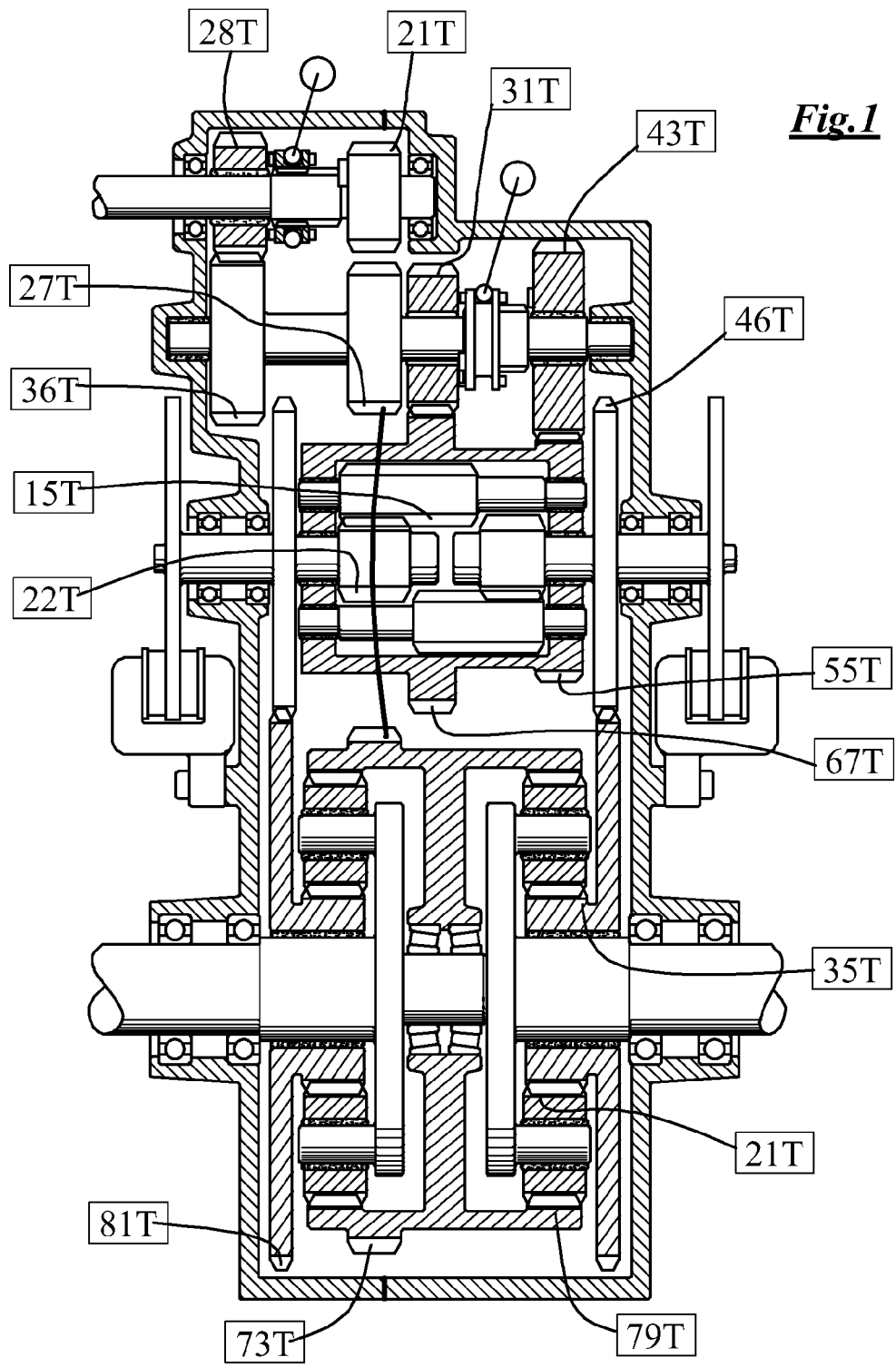
FIG. 1 is a diagrammatic cross-sectioned end-elevation of a power transmission and steering system.

The transmission system shown in the drawings is contained in a transmission housing 20. Motive drive power from crankshaft 132 of the engine 130 of the vehicle is applied to the engine-shaft 23. Typically, the drive power from the engine is not applied directly to the engine-shaft 23, but rather is transmitted through a variable-speed drive, advantageously of the steplessly-variable type 114.

Drive power passes through the transmission system from the engine-shaft 23 to the left and right wheel-shafts 25L,25R in a manner to be described. Typically, the wheel-shafts 25 are not connected to the road wheels directly, but are connected thereto by respective chain drives, typically at a ratio of e.g two-to-one.

Steering of the vehicle is effected by braking one or other of the brake-discs 27L,27R, which is done by actuating one or other of the left and right hydraulic brake calipers. Braking of the vehicle is done by actuating both calipers together.

An engine-forward-gear 30 and an engine-reverse-gear 32 are carried on the engine-shaft 23, and are mounted on bearings for rotation relative to the engine-shaft 23. Also carried on the engine-shaft 23 is a forward/reverse selector-sleeve 34, which is splined to the engine-shaft, i.e the selector-sleeve 34 is constrained to rotate with the engine-shaft 23, but can slide axially along the engine-shaft.

The engine-forward-gear 30 drives an intermediate-forward-gear 36, which is solid with the intermediate-shaft 38. The engine-rev-gear 32 drives an intermediate-reverse-gear 43, which also is solid with the inter-shaft 38.

The engine-forward-gear 30 drives the inter-forward-gear 36 by being in direct mesh therewith; the engine-rev-gear 32 drives the inter-rev-gear 43 through a reverse-idler-gear 40, which is mounted for rotation upon on a reverse-idler-shaft 41. The reverse-idler-gear 40 spins freely (in bearings) on the reverse-idler-shaft 41, which is itself fixed into the gearbox housing.

When the forward/reverse selector-sleeve 34 is moved to the left (FIG. 1), the sleeve 34 engages with the engine-forward-gear 30, which is thereby forced to rotate with the engine-shaft 23. When the forward/reverse selector-sleeve 34 is moved to the right, the selector-sleeve 34 engages with the engine-rev-gear 32, whereby now the engine-rev-gear 32 is forced to rotate with the engine-shaft 23.

When the forward/reverse selector-sleeve 34 is engaged with the engine-forward-gear 30, the selector-sleeve 34 is clear of the engine-rev-gear 32, which is therefore free to rotate relative to the engine-shaft 23. That is to say: when FORWARD is selected, the engine-rev-gear 32 and the reverse-idler-gear 40 are rotationally free of the engine-shaft 23. Correspondingly, when REVERSE is selected, i.e when the forward/reverse selector-sleeve 34 is engaged with (i.e dogged to) the engine-rev-gear 32, the selector-sleeve 34 is clear of the engine-forward-gear 30, which is therefore free to rotate relative to the engine-shaft 23.

The inter-shaft 38 is driven either forwards (through the inter-for-gear 36) or in reverse (through the inter-rev-gear 43), depending on the position of the forward/reverse selector-sleeve 34. The designer should see to it that the range of the left-right movement of the selector-sleeve 34 includes a sufficiently large neutral portion, and also should ensure that it is impossible for FORWARD and REVERSE to be engaged at the same time.

The engine-forwards-gear 30 has twenty-eight teeth, and the inter-for-gear 36 has thirty-six teeth. Thus, when the engine-shaft 23 is driven at e.g +1000 revolutions per minute (rpm), the inter-shaft 38 rotates at an intershaft speed of 1000*28/36=−778 rpm. (The negative sign indicates rotation in the opposite sense to the rotation of the engine-shaft 23). The engine-rev-gear 32 has twenty-one teeth, and the inter-rev-gear 43 has twenty-seven teeth; thus, in reverse, when the engine-shaft-speed is +1000 rpm, the inter-shaft speed is 1000*21/27=+778 rpm.

The inter-rev-gear 43 also doubles as a drive transmission gear, or inter-drive-gear, for conveying drive power to the wheel-differentials. The inter-drive-gear/inter-rev-gear 43 meshes with a wheel-drive-gear 45, which is solid with a wheel-ring 47 of the wheel-differentials. The wheel-drive-gear 45 has seventy-three teeth, whereby, when the engine-shaft-speed is +1000 rpm and the intershaft speed is −778 rpm, the speed of the wheel-ring is 778*27/73=+288 rpm.

Also carried on the intershaft 38 are an intermediate-high-gear 50, and an intermediate-low-gear 52. These two gears are mounted on bearings for rotation relative to the inter-shaft 38. Either one of the two gears 50,52 can be rotationally-locked to the inter-shaft 38 by means of an axially-slidable high/low selector-sleeve 54, which is splined to the intershaft 38. As was the case with the for/rev selector, only one at once of the two gears 50,52 can be locked to the intershaft 38.

The inter-high-gear 50 (thirty-one teeth) meshes with a steer-high-gear 58 (sixty-seven teeth). The steer-high-gear 58 is solid with the steer-housing 60 of the steer-differential. The inter-low-gear 52 (forty-three teeth) meshes with a steer-low-gear 63 (fifty-five teeth), which also is solid with the steer-diff-housing 60. Thus, when the engine-shaft is at +1000 rpm, and the intershaft speed is −778 rpm, the speed of the steer-housing 60 is 778*31/67=+360 rpm in HIGH mode, and is 778*43/55=+608 rpm in LOW mode.

It may be noted that the hi/lo selector does not operate directly to change the gear ratio between the intershaft 38 and the wheel-ring 47; rather, the hi/lo selector operates to change the gear ratio between the intershaft 38 and the steer-differential.

The operation of the steer-differential will now be described. Left and right steer-shafts 27L,27R are mounted in bearings for rotation relative to the gearbox housing 20. Respective brake discs 67L,67R, and respective steer-sun-gears 69L,69R, are solid with the steer-shafts.

The steer-diff-housing 60 carries a number (four, in the example) of steer-spindles 70, which carry respective left steer-planet-gears 72L and right steer-planet-gears 72R (there are two of each, in the example). The left steer-planet-gears 72L (one of which is shown uppermost in FIG. 1) mesh with the left steer-sun-gear 69L on the left steer-shaft 27L, and the right steer-planet-gears 72R (one of which is shown lowermost in FIG. 1) mesh with the right steer-sun-gear 69R on the right steer-shaft 27R.

Although it is not apparent from the diagram of FIG. 1, it should also be understood that, in the steer-differential, the left steer-planet-gears 72L are in direct mesh with the right steer-planet-gears 72R—but out of the plane of the drawing, as indicated by the line 74.

During straight-ahead motion of the vehicle, no relative rotations take place in the steering differential. When the vehicle is proceeding straight ahead, the left and right steer-shafts 27L,27R are both rotating at the same rate, and in the same directional sense, as the steer-diff-housing 60. The left and right steer-sun-gears 69L,69R (being solid with the left and right steer-shafts 27L,27R) rotate with the respective steer-shafts. There is no relative rotation between the planet-gears 72L,72R. That is to say, during straight, i.e unsteered, forward movement of the vehicle, the steer-diff rotates, as a unitary whole. (The same applies also during unsteered reverse movement of the vehicle.)

To initiate steering, the vehicle driver brakes an appropriate one of the left or right brake-discs 67L,67R. Upon braking the left brake-disc 67L, the tightest turn is realised when the left steer-shaft 27L (with its associated unitary left steer-sun-gear 69L and its associated unitary left steer-wheel-gear 76L) is brought to a complete stop, relative to the housing 20. Partial braking of the brake-disc enables a larger steering radius.

Now, as stated, the steer-diff-housing 60 is rotating around the stationary left steer-sun-gear 69L at either +360 rpm (high mode) or at +608 rpm (low mode). Thus, the two left steer-planet-gears 72L, which are carried by the steer-diff-housing 60, are rotating, also in the positive sense, around the stationary (braked) left steer-sun-gear 69L.

Figure 2:
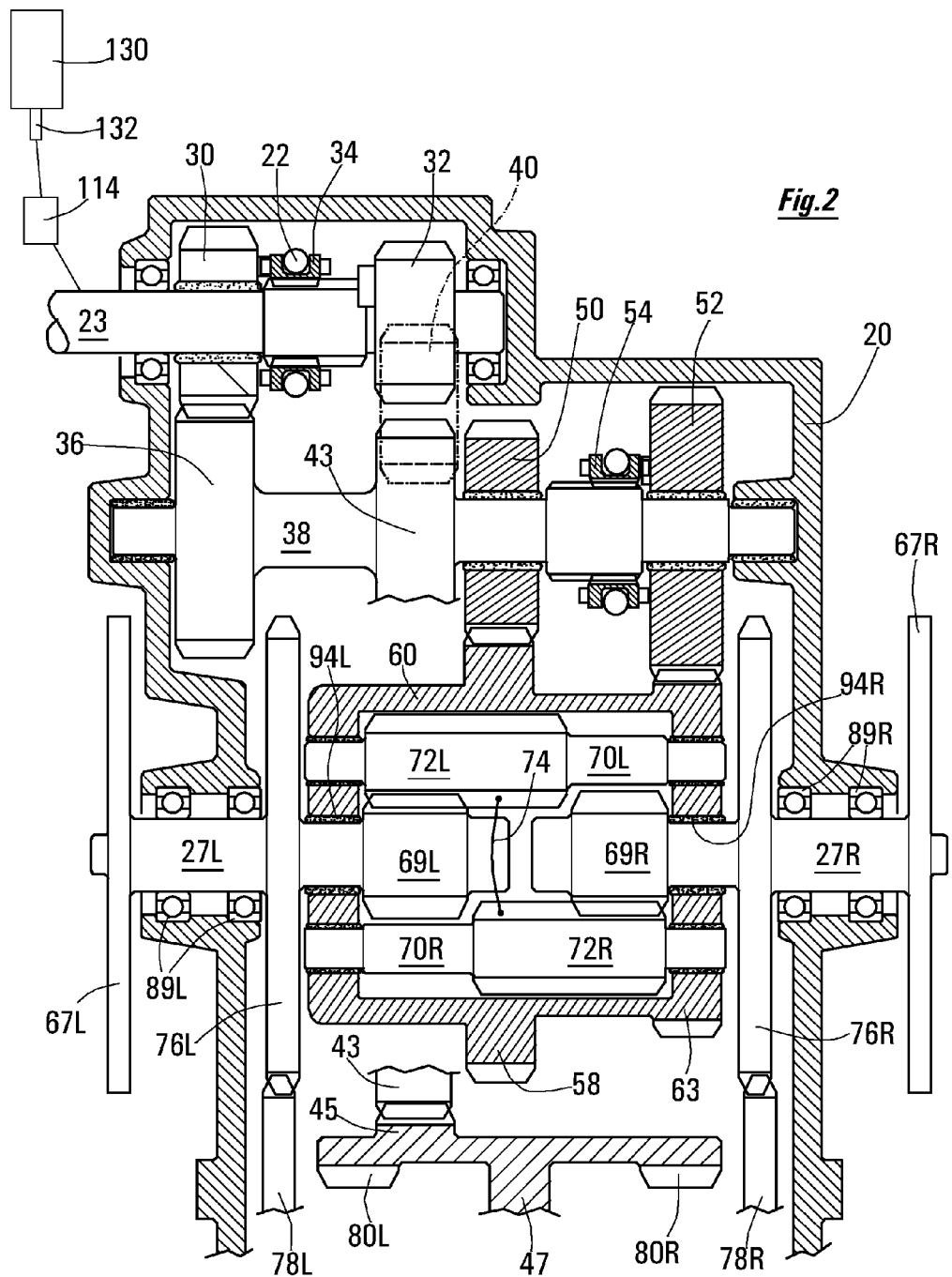
FIG. 2 is a close-up of an upper portion of the system of FIG. 1, and includes reference numerals for some of the elements of the system, as used in the following description.
Figure 3:
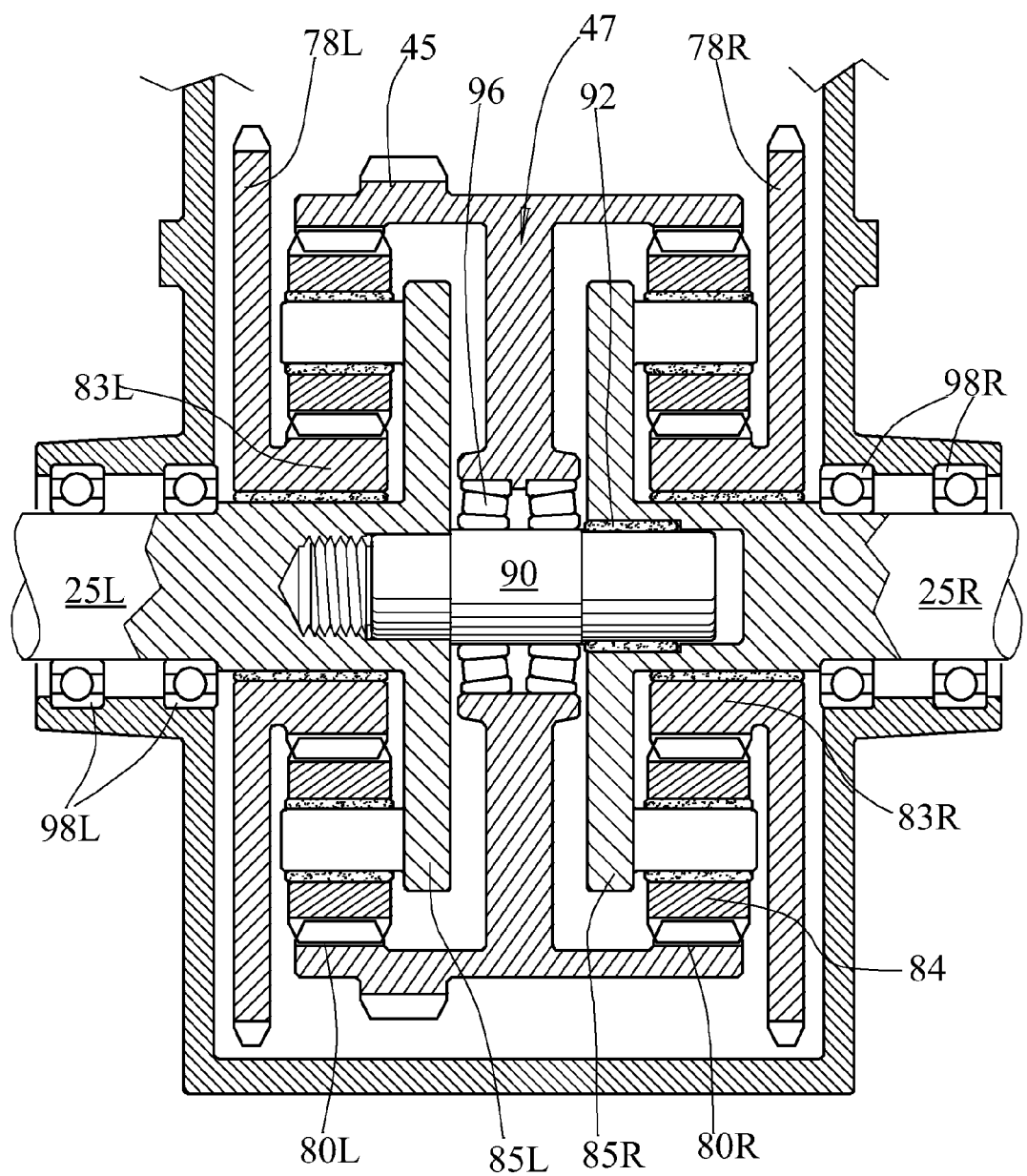
FIG. 3 is a close-up of a lower portion of the system of FIG. 1, and includes reference numerals for some of the elements of the system, as used in the following description.

These left steer-planet-gears 72L are in mesh with the right steer-planet-gears 72R. (Again, this in-mesh relationship of the left and right steer-planet-gears is not shown in the drawings, but is suggested by the line 74 in FIG. 2.) Therefore, the right steer-planet-gears 72R are driven to rotate in the opposite, negative, sense. Therefore, in turn, the right steer-sun-gear 69R is driven to rotate positively, at twice the speed at which the steer-housing 60 is rotating positively. The fast-rotating right steer-sun-gear 69R carries with it the right steer-shaft 27R and the right steer-wheel gear 76R, and also the right brake-disc 67R.

Thus, again with the engine-shaft rotating at +1000 rpm, whereby the steer-diff-housing 60 is rotating at +360 rpm (high) or +608 rpm (low), the action of the steering-differential can be summarized as:—

When the vehicle is being steered straight forward, both steer-shafts 27L,27R rotate (in unison with the housing 60) at +360 rpm (HIGH) or +608 rpm (LOW).

During steering, when the left steer-shaft 27L is braked to a standstill, now the right steer-shaft 27R is rotating at double the housing speed, i.e at +720 rpm (HIGH) or +1216 rpm (LOW).

The operation of the wheel-differentials will now be described. The left and right steer-wheel-gears 76L,76R (each forty-six teeth), being solid with the steer-shafts 27L,27R, are in mesh respectively with left and right wheel-steer-gears 78L,78R. The left and right wheel-steer-gears 78L,78R each have eighty-one teeth. Therefore, the wheel-steer-gears 78L,78R rotate at 46/81 of the speeds of the respective steer-wheel-gears 76L,76R.

Thus, in straight-ahead motion, the engine-shaft 23 rotating at +1000 rpm, the wheel-steer-gears 78L,78R rotate both at 360*46/81=−204 rpm in HIGH mode, and at 608*46/81=−345 rpm in LOW mode.

The left and right wheel-differentials share a common wheel-differential-housing, being the said wheel-ring 47. The wheel-ring 47 carries the wheel-drive-gear 45. The wheel-drive-gear 45 is, as mentioned, in mesh with the inter-drive-gear 45 that is solid with the intershaft 38. When the engine-shaft 23 rotates at +1000 rpm, the wheel-drive-gear 45 rotates at 1000*28/36*27/73=+288 rpm. The wheel-drive-gear 45 remains in this same fixed ratio with respect to the intershaft 38, during forwards motion, whether HIGH or LOW is selected, and whether or not the vehicle is being steered. (In reverse, the fixed ratio is slightly different.)

The equation or formula that relates the speeds of the various components of an epicyclic gearset can be expressed as follows. An epicyclic gearset includes a sun-gear, and planet-gears that mesh with the sun-gear. The gearset also includes a ring-gear having inwards-facing teeth, which mesh with the planet-gears. The planet-gears are mounted on respective legs of a rotating spider. The sun-gear, the spider, and the ring-gear, are mounted for relative rotation about a common axis. The formula is:—

$$R\text{-spider}=R\text{-ring}*T\text{-ring}/(T\text{-ring}+T\text{-sun})-R\text{-sun}*T\text{-sun}/(T\text{-ring}+T\text{-sun})$$

The prefix R refers to a rotary speed (e.g in rpm) of the stated component. The prefix T refers to the number of teeth on the stated gear.

In the transmission system as described herein, in respect of the left and right wheel differentials, T-ring is the number of teeth in the wheel-ring-gears 80L,80R, being seventy-nine teeth, and T-sun is the number of teeth in the wheel-sun-gears 83L,83R, being thirty-five teeth. Thus, for this gearbox, the above formula becomes:

$$R\text{-wheelspider}=R\text{-wheelring}*79/(79+35)-R\text{-wheelsun}*35/(79+35),$$

i.e:

$$R\text{-wheelspider}=R\text{-wheelring}*0.693-R\text{-wheelsun}*0.307.$$

Again, the speeds of the various shafts are computed on the basis that the engine-shaft 23 is rotating at +1000 rpm. To recap, with no steering, the left and right steer-wheel-gears 76L,76R (forty-six teeth) are in mesh respectively with the left and right wheel-steer-gears 78L,78R (eighty-one teeth), whereby, in unsteered motion, and the engine-shaft 23 rotating at 1000 rpm, the wheel-steer-gears 78L,78R rotate at 360*46/81=−204 rpm in HIGH mode, and at 608*46/81=−345 rpm in LOW mode.

Wheel-sun-gears 83L,83R of the wheel-diffs are solid with, and rotate with, the wheel-steer-gears 78L,78R. Thus, unsteered, the two wheel-sun-gears 83L,83R rotate both at −204 rpm in HIGH mode, and both at −345 rpm in LOW mode. These figures can be entered in the above formula as the R-sun term, respectively for the HIGH and LOW modes.

The R-ring term in the formula is the speed of the wheel-ring 47, which is common to the two wheel-differentials, the speed being +288 rpm.

Figure 1A:
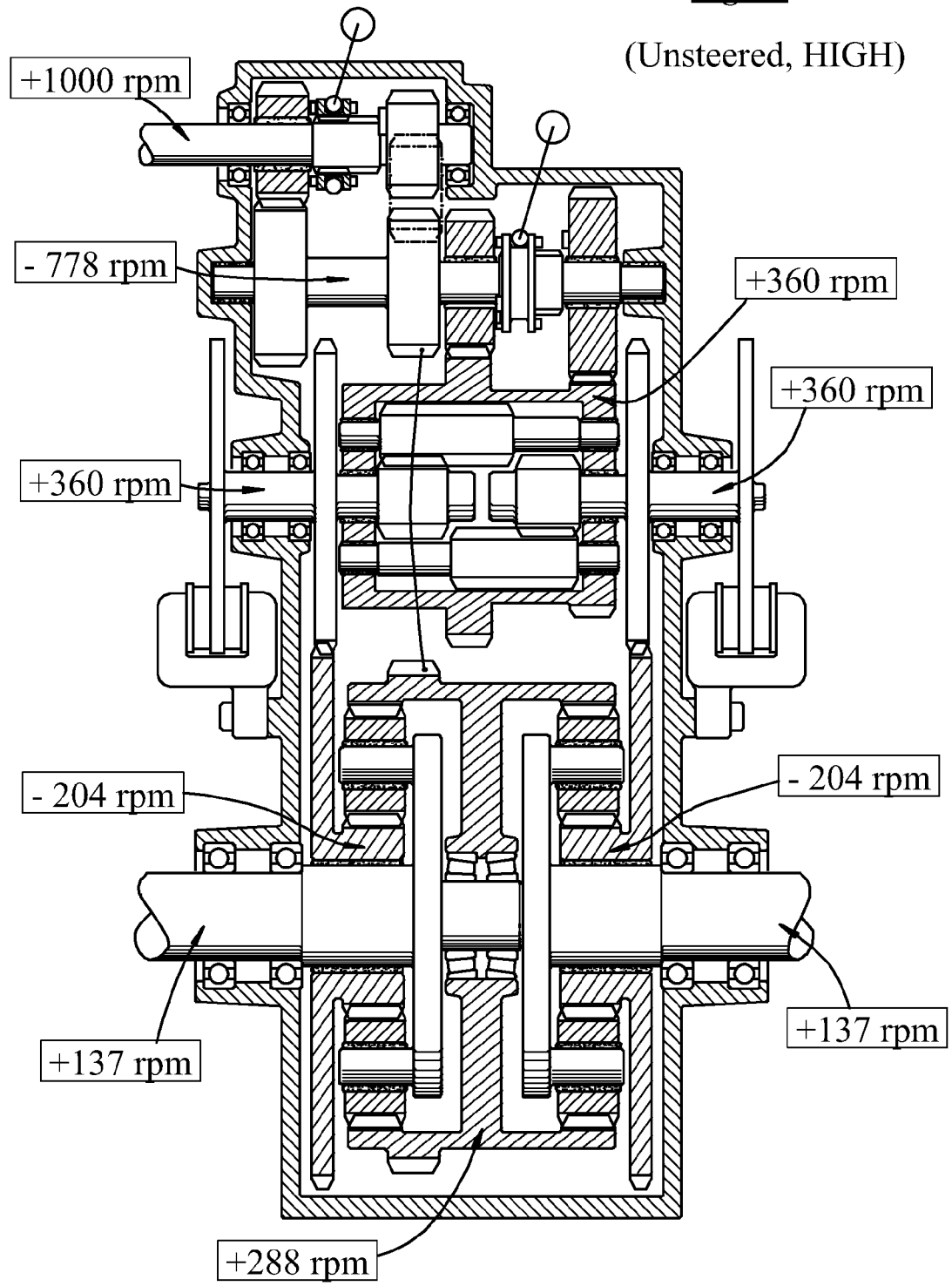
FIG. 1a is the same as FIG. 1, but includes the rotational speeds of some of the elements.
Figure 1B:
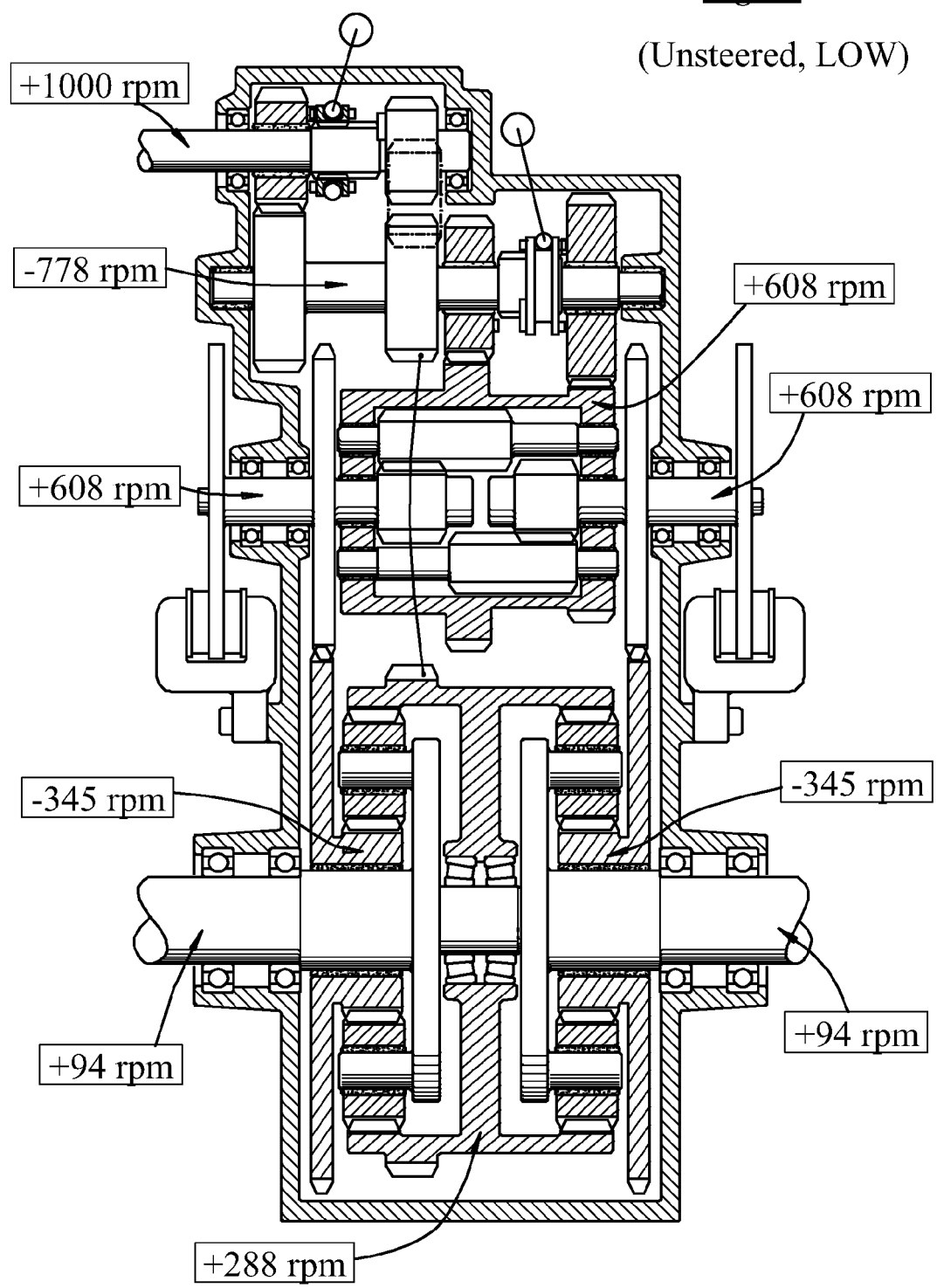
FIG. 1b is the same as FIG. 1a except that, in FIG. 1b, the vehicle is performing unsteered motion in LOW mode.

Left and right wheel-spiders 85L,85R are solid with the left and right wheel-shafts 25L,25R. Now, the speeds of the left and right wheel-spiders 85L,85R can be determined, upon entering the R-ring and R-sun figures in the above formula. Thus, for straight ahead motion, the formula (R-spider=R-ring*0.693−R-sun*0.307) in respect of both wheel-diffs, computes as:— in unsteered HIGH mode (FIG. 1a),

*R*-wheelspider-unsteered-high=288*0.693−204*0.307=200−63=+137 rpm.

and in unsteered LOW mode (FIG. 1b),

*R*-wheelspider-unsteered-low=288*0.693−345*0.307=200−106=+94 rpm.

Again, the wheel-spiders 85L,85R are solid with the wheels-shafts 25L,25R, so these computed speeds of the wheel-spiders are also the speeds of the wheel-shafts.

The corresponding computations in respect of steering the vehicle will now be addressed. During steering, one or other of the brake discs 67L,67R is arrested (by actuating the appropriate one of the brake calipers).

For computation purposes, it is regarded that the brake-disc is brought to a complete stop (i.e its speed is zero rpm). In that case, the steering radius of the turn is pre-determined by the gear-ratios, and is a minimum.

During driving, usually drivers will wish to execute a turn at some other (larger) turning-circle than the minimum, which involves only partially arresting one of the brake-discs.

During normal cruising of the ATV over trails and tracks, nearly all steering will involve only-partial braking. One of the benefits of the present gearbox design is that the wastage of energy usually associated with brake-steering can be minimized. That is to say, in the HIGH mode, the designer sets the minimum turning-circle to quite a high value, whereby the actual turning-circle diameter that an average driver would wish to use, on an average bend on a reasonable-terrain trail, is not so far removed from that minimum.

Figure 1C:
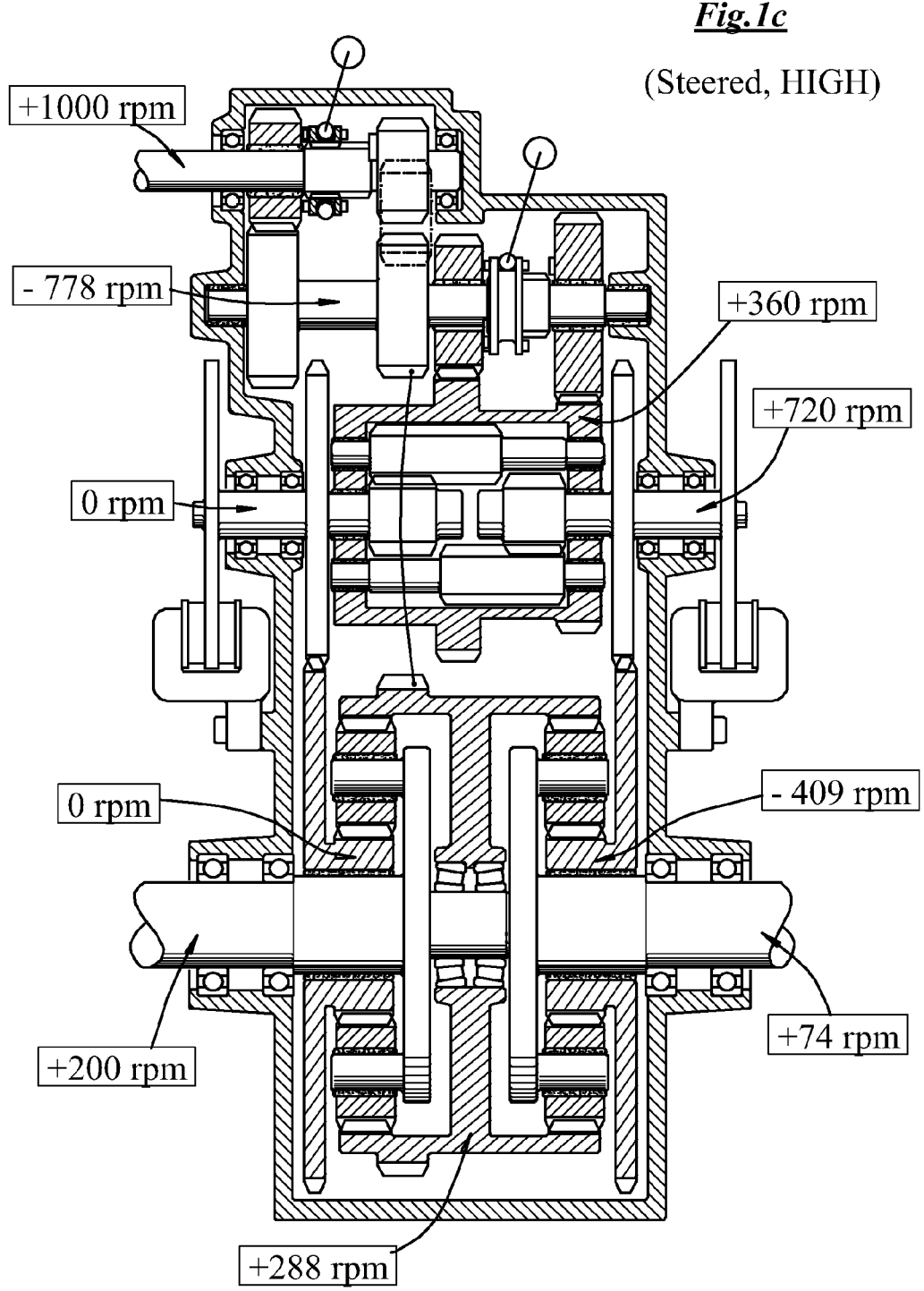
FIG. 1c is the same as FIG. 1a except that, in FIG. 1c, the vehicle is performing steered motion in HIGH mode.

In the exemplary gearbox described herein, the minimum turning circle in HIGH mode corresponds to the "steered, HIGH" condition shown in FIG. 1c. The actual turning-circle diameter depends on the dimensions of the vehicle and roadwheels, chain-drive ratios, etc, but is proportionally dependent upon the ratio of the speeds of the two wheel-shafts 25L,25R. In this case, that ratio for maximum steering effect (termed the maximum HIGH-mode steer-ratio) is 200/74, or 2.7. In a normal turn, done with only-partial braking, the higher steer-radius would be larger, i.e the steer ratio would be a smaller number.

In the present gearbox system, it is not difficult to provide the gear ratios needed to produce such a minimum turning-circle (i.e the turning-circle produced when the brake-disc is brought to a complete stop), in the HIGH mode, such that an average driver would rarely, if ever, wish to drive the ATV around a corner that has a tighter radius than that minimum radius.

If a very tight corner should be encountered while in HIGH mode, one would have to (stop and) select LOW mode; and, of course, that would be tiresome if it happened often. But it is recognized that corners as tight as that are only rarely encountered on reasonable trails, whereby an ATV equipped as described herein can cruise for long periods in HIGH mode. An advantageous aim of the present system is to combine the cruising efficiency and easy drivability of the HIGH mode with the ability, when in the LOW mode, to perform very tight turns.

It should be understood that it is not the intent that drivers would start off in LOW mode, and then shift to HIGH mode once cruising speed was reached; rather, the drivers select LOW or HIGH mode according to what kind of terrain they expect to meet—HIGH for good, LOW for bad. In the described vehicle, the changing speed-ratio requirements, moment by moment during driving, are handled by a continuously-variable automatic transmission (CVT), as explained below.

As mentioned, with the left brake-disc 67L (together with left steer-shaft 27L and the left steer-sun-gear 69L) is braked down to zero rpm, the speed of the right steer-sun-gear 69R now increases to double the speed of the steer-diff-housing 60, because of the operation of the steer-differential. Given that the steer-diff-housing 60 is rotating either at 360 rpm (HIGH) or at 608 rpm (LOW), (per 1000 rpm of the engine-shaft) the right steer-sun-gear 69R (and with it the right steer-wheel-gear 76R) rotates either at 720 rpm (HIGH) or 1216 rpm (LOW).

Thus, in the left wheel-diff, the left wheel-sun-gear 83L rotates at 0 rpm (HIGH or LOW); i.e R-leftsun-steered=zero. In the right wheel-diff, the right wheel-sun-gear 83L rotates at:— in steered HIGH mode,

*R*-rightsun-steered-high=720*46/81=−409 rpm, or at:

in steered LOW mode,

*R*-rightsun-steered-low=1216*46/81=−691 rpm.

Figure 1D:
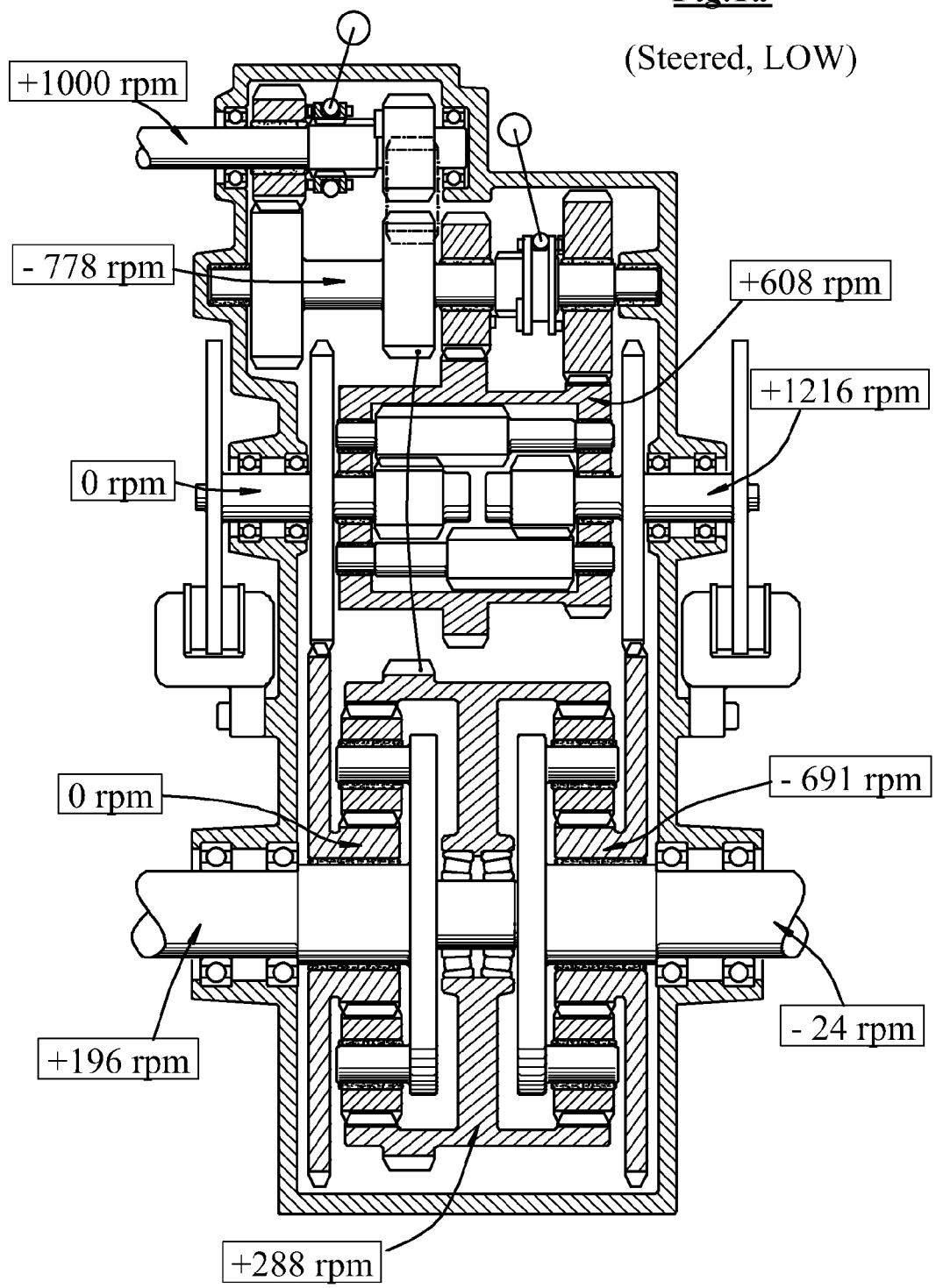
FIG. 1d is the same as FIG. 1a except that, in FIG. 1d, the vehicle is performing steered motion in LOW mode.

So now, the engine-shaft rotating at +1000 rpm and the left brake disc being arrested, the above formula (R-spider=R-ring*0.693R-sun*0.307) computes as:— in steered HIGH mode (FIG. 1c), right side,

*R*-rightspider-steered-high=288*0.693−409*0.307=200−126=+74 rpm.

in steered HIGH mode (FIG. 1c), left side,

*R*-leftspider-steered-high=288*0.693−0=+200 rpm in steered LOW mode (FIG. 1d), right side,

*R*-rightspider-steered-low=288*0.693−691*0.307=200−212=−12 rpm.

in steered LOW mode (FIG. 1d), left side,

*R*-leftspider-steered-low=288*0.693−0=+200 rpm.

Thus, in HIGH mode, the tightest right-turn steering radius occurs at a right wheel-shaft speed of +74 rpm together and a left wheel-shaft speed of +200 rpm. In LOW mode, the tightest steering radius occurs at a right wheel-shaft speed of −12 rpm and a left wheel-shaft speed of, again, +200 rpm. (Again, it is noted that these numerical values apply per thousand rpm of the engine-shaft 23.)

Thus, the steering radius is, in LOW mode, considerably tighter than it is in HIGH mode. It may be regarded that the tightest steering radius in LOW mode is the radius that corresponds to the wheels (or track) on the slow side of the vehicle being brought to a halt—or rather, indeed, it will be noted that the slow left wheel-shaft 25L is not quite stopped, but in fact turns slowly backwards (indicated by the negative sign of the −12 rpm figure). By contrast, in HIGH mode, during the tightest turn, both wheels are rotating forwards.

Rotating the slower of the two wheel-shafts slowly backwards during a tight forward turn is effective to prevent, or at least to inhibit, the road-wheels or track on the slow side from tending to slip and slide. It is when the slow-side wheels or track are actually stationary that the treads or cleats tend to become clogged with clinging slippery ground material, and then start to slip.

The situation when travelling in reverse is very similar, in that the choice between HIGH and LOW is available in both FORWARD and REVERSE. Typically, the overall engine-to-wheels ratio in reverse is slightly lower (i.e the vehicle will not travel quite so fast in reverse), but apart from that the REVERSE operational choices are identical to the FORWARD operational choices.

It will be understood that this choice of operational modes is highly effective in making it possible, at least for an experienced driver, to extricate a vehicle that has become bogged down. By judicious exercise of the choice between FORWARD and REVERSE, and between HIGH and LOW, the vehicle can be extracted from (almost) any adverse situation.

Thus, if the vehicle has become bogged, the driver has four modes available, to try to extricate the vehicle. In fact, even more "modes" than that are available, in conjunction with the different steering modes, and can be listed as:

(a)(i) for/hi steered-left, (ii) for/hi steered-right, (iii) for/hi unsteered;
(b)(i) for/lo steered-left, (ii) for/lo steered-right, (iii) for/lo unsteered;
(c)(i) rev/hi steered-left, (ii) rev/hi steered-right, (iii) rev/hi unsteered; and
(d)(i) rev/lo steered-left, (ii) rev/lo steered-right, (iii) rev-lo unsteered.

The reason why STEERED and UNSTEERED can be classed as different or separate modes may be explained as follows. When the vehicle is not being steered, the two steer-shafts are not constrained as to their rotational speeds relative to each other, and the sum of the speeds of the two steer-shafts 27L, 27R simply equals twice the speed of the steer-diff-housing 60. But when the vehicle is being steered (i.e when one of the steer-shafts is being (partially) arrested), it can now be regarded that a degree of freedom has been removed from the system, and now the left wheels are constrained to rotate at a certain multiple of the speed of the right wheels. Still the sum of the left steer-shaft speed and the right steer-shaft speed equals twice the speed of the steer-diff-housing, but now the ratio or multiple between the left steer-shaft speed and the right steer-shaft speed is also constrained, being set by the degree of braking of the one steer-shaft. Therefore, if traction is lost on one side of the vehicle, that fact does not affect the ratio or multiple; that is to say, the speed of the left wheels is constrained to be the same ratio or multiple of the speed of the right wheels.

Thus, it may be regarded that there are actually twelve separate and distinct modes that the driver can select, by manipulation of the gear shifts and the steer-brakes, in attempting to extricate the vehicle from e.g a swamp. It would be very adverse conditions indeed in which not one of those twelve modes could provide enough traction to enable the vehicle to move. Again, all twelve of these selectable modes are provided by the very simple and robust arrangement as shown.

In the system as described, despite the large number of available modes, the change or shift mechanism is simple. The nature of a forward/reverse mechanism on a vehicle is that the mechanism is of the simple two-position kind, which can be engineered at relatively low cost and high robustness. In the present case, the hi/low mechanism again is of the simple-two-position kind, which is just as simple and robust as the for/rev mechanism. (It will be understood that if there were, say, three transmission modes (e.g high, middle, low), instead of two, the shift change mechanism immediately thereby becomes very much more complex. But shifting between just two modes requires only the simplicity as described and shown herein.)

When a vehicle is amphibious, the task of driving the vehicle out of water, and up and onto and over a soft swampy bank, can be particularly testing; however, when such an amphibious vehicle is equipped as described herein, the driver can be expected to make short work of the same operation. It might even sometimes be possible for a skilled driver to perform the very formidable task of manoeuvring the vehicle out of water and up onto ice.

In the vehicle equipped as described, the designers' intent typically would be for the driver to select HIGH mode when touring over reasonable trails in the upper half of the speed range. The driver would select LOW mode when negotiating more demanding terrain, which is best traversed in the lower half of the speed range.

Changing between FORWARD and REVERSE is accomplished by manually operating the forwards/reverse shift-lever. This movement causes a for/rev shift-rod 21 to rotate. A for/rev shift-fork 22, mounted on and fixed to the for/rev shift-rod 21, engages the for/rev selector-sleeve 34, and slides the selector-sleeve 34 along the splines of the engine-shaft 23. In turn, this movement dogs the selector-sleeve 34 either to the engine-for-gear 30 or to the engine-rev-gear 32. Thus, the driver is able to set the vehicle either in FORWARDS or in REVERSE (or in NEUTRAL).

Figure 4:
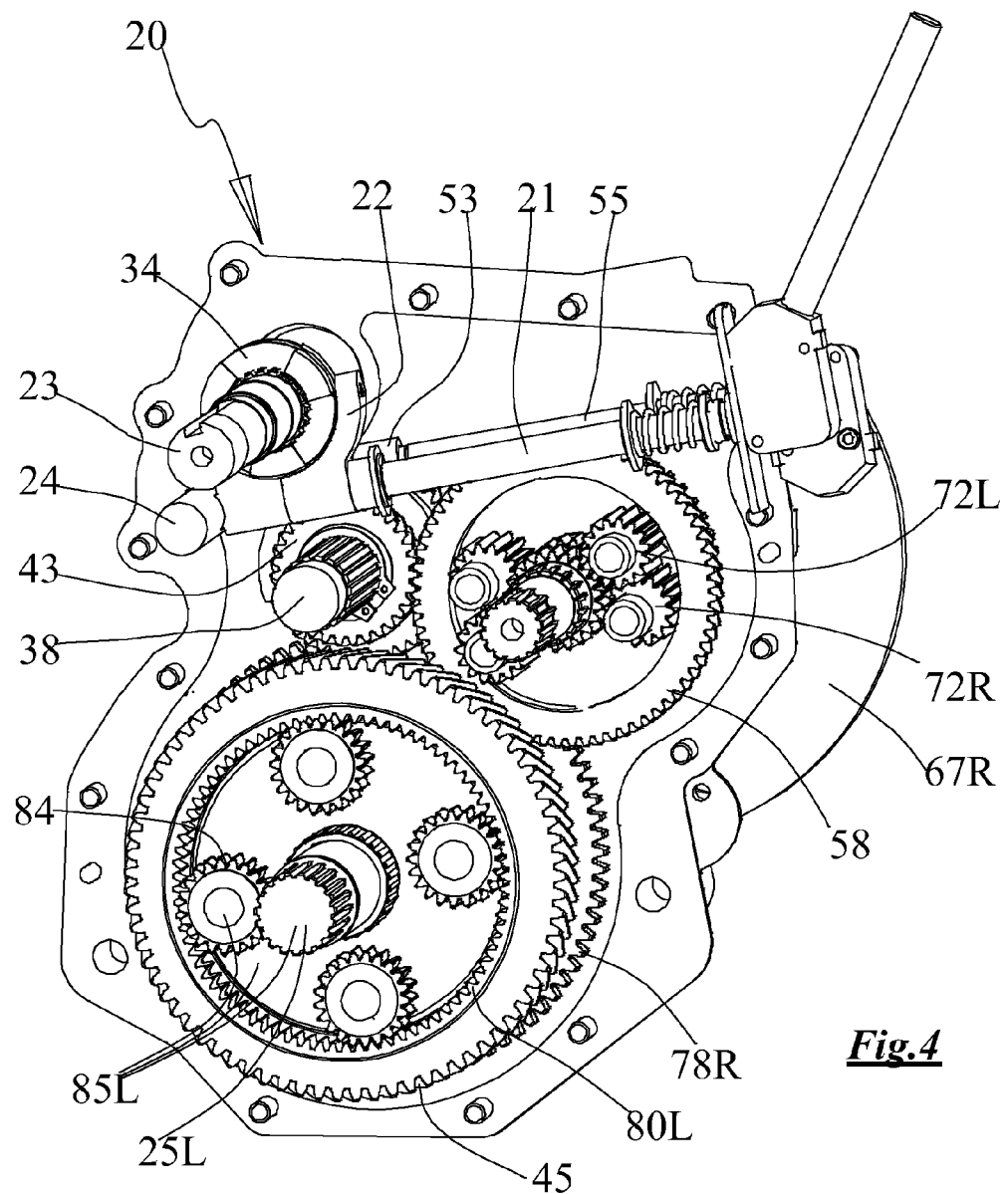
FIG. 4 is a side-elevation of the system of FIG. 1

The left end (FIG. 4) of the for/rev shift-rod 21 is carried in and supported by the reverse-idler-shaft 24 upon which the reverse-idler-gear 40 is mounted for rotation. The reverse-idler-shaft 24 does not itself rotate; it simply fits into respective receiving-sockets machined in the two halves of the housing 20. The for/rev-shift-rod 21 fits, in turn, into a receiving-socket machined in the reverse-idler-shaft 24. The shift-rod 21 rotates (i.e pivots) in its receiving socket in the rev-idler-shaft 24.

The right end of the for/rev-shift-rod 21 passes out through an opening in the gearbox housing 20, terminating in the for/rev shift-lever. The said opening in the gearbox housing has to be sealed, but the designer's task is simplified by the fact that the for/rev-shift-rod 21 is only rotary, and does not involve any sliding in and out of the housing (which is not true of shift-rods in many other gearbox designs). Providing the receiving socket for the left end of the shift-rod 21 in the reverse-idler-shaft 24 means that such a receiving socket does not have to be provided in the gearbox housing—which, if it did have to be provided, would (because it would be at the wrong angle for simple machining of the housing) be an awkward and expensive operation.

It will be understood that the mechanism for changing between HIGH and LOW mode is mechanically identical to the mechanism for changing between FORWARD and REVERSE—except that, where in the case of the for/rev mechanism the for/rev shift-fork 22 protrudes upwards (FIG. 4) from the for/rev shift-rod 21, in the case of the hi/lo mechanism the hi/lo shift-fork 53 protrudes downwards from the hi/lo shift-rod 55. The hi/lo shift-fork 28 slides the hi/lo selector-sleeve

54 along the splines of the inter-shaft 38, whereby the hi/lo selector-sleeve 54 dogs either the inter-high-gear 50 or the inter-low-gear 52 to the inter-shaft 38.

When REVERSE is selected, motive power is transmitted through a reverse-idler-gear 40 to the inter-reverse-gear 43. The inter-reverse-gear 43 doubles as the inter-drive-gear, through which both FORWARD and REVERSE drive is transmitted to the wheel-drive-gear 45 on the wheel-ring 47.

It will be understood that, in REVERSE, the inter-reverse-gear 43, being also the inter-drive-gear 43, is in drive-transmitting mesh not only with the reverse-idler-gear 40 but also with the wheel-drive-gear 45. Thus, in REVERSE, the inter-rev-gear 43 is in power-transmitting mesh with two other gears.

Changing between the HIGH and the LOW drive modes is accomplished by operating the high/low shift lever. The shift-change components used for selecting between HIGH and LOW modes is done by the use of similar components to the for-rev components. When the hi/lo-sleeve 54 is moved to the right, dogs on the sleeve engage complementary dogs on the intermediate-low-gear 52, locking that gear to the inter-shaft 38. The inter-low-gear 52 is in mesh with the steer-low-gear 63, thereby transmitting drive to the steer-differential-housing 60. When the hi/lo-sleeve 54 is moved to the left, now drive power is transmitted from the inter-shaft 38 to the steer-diff-housing 60 through the inter-high-gear 50 and the steer-high-gear 58.

Thus, the intershaft 38 transmits motive power, either at the HIGH ratio or at the LOW ratio, directly to the housing 60 of the steer-differential. The steer-wheel-gears 76 are in direct mesh with the wheel-steer-gears 78; in effect, therefore, the two steer-sun-gears 69 of the steer-diff are in direct mesh with the respective wheel-sun-gears 83 of the wheel-diffs.

By this arrangement, the speed of the left wheel-sun-gear 83L is a constant fixed multiple of the speed of the left steer-sun-gear 69L; equally, the speed of the right wheel-sun-gear 83R is a constant fixed multiple of the speed of the right steer-sun-gear 69R. Thus, as one or other of the brakes is actuated, thus setting up relative rotations inside the steer-diff, the speed of the left steer-sun-gear 69L now differs from the speed of the right steer-sun-gear 69R. These differences in the speeds of the steer-sun-gears of the steer-diff are immediately reflected as corresponding differences in the speeds of the two wheel-sun-gears 83L,83R of the wheel-diffs. Thus, it can be regarded that operation of one or other of the brakes has the effect of driving the two wheel-sun-gears 83L,83R to rotate at different speeds.

The steer-diff therefore has a direct effect on the wheel-sun-gears 83 of the wheel-diffs. By contrast, operational internal movements within the steer-diff have no effect on the speed of the wheel-ring 47 of the wheel-diffs, the speed of the wheel-ring being determined only by the speed of the engine-shaft 23. In the wheel-diffs, the speeds of the wheel-spiders 85 (and hence of the wheel-shafts 25) are determined by summing the speeds of the wheel-ring-gears 80 and the wheel-sun-gears 83, in the formula mentioned above.

This manner of arranging the steering of the vehicle contributes to making it possible for the present system, which is indeed a true triple-differential system, to be of simple, and very robust, construction, and to be suitable for use in a comparatively low-powered vehicle.

The designer should provide facility for a NEUTRAL position of the forwards/reverse shift-lever, in which the for/rev selector-sleeve 34 is out of engagement with both the engine-forward-gear 30 and the engine-reverse-gear 32.

However, changing between the HIGH and LOW modes preferably should be only a two-position choice. If the hi/lo sleeve 54 were ever to be in neutral, now the steer-differential would simply spin freely, and it would not be possible to steer the vehicle. Therefore, the hi/lo shift-lever should incorporate a snap-action mechanism, for example an over-centre spring mechanism, which is effective to provide a force that tips the hi/lo sleeve 54 either left towards the inter-high-gear 50 or right towards the inter-low-gear 52, with no neutral position therebetween.

It is contemplated that operating the high/low shift-lever, to change between HIGH and LOW modes, should be done preferably only when the vehicle is stationary. (It cannot be ruled out that sometimes a driver might effect the change between HIGH and LOW modes while motive power is being transmitted.)

As mentioned, preferably, a continuously-variable transmission (CVT) is operatively located between the vehicle's engine and the engine-shaft 25. Designers are aware that CVTs generally are not suitable for use with higher powered engines (i.e above, say, thirty kilowatts). However, at the lower powers, CVT engineering is well developed, and well known. Typically, a CVT drive is based on the provision of a pair of pulleys, connected by a drive belt. Each pulley comprises a pair of cheeks, and the CVT is so structured that the axial separation distance between the cheeks of the pulleys can be varied. A change to the axial separation causes the belt to climb up outwards, or to move down into, the vee between the cheeks, consequently changing the radius at which the belt receives and exerts the drive forces from and to the pulleys.

The union, in an all-terrain vehicle, of a CVT drive with simple skid-steering, is not particularly advantageous. Simple skid-steering can be crude and violent, and drivers might shrink from the prospect of driving a vehicle so equipped over winding trails for long periods. By contrast, the union between a CVT drive and a triple-diff transmission of the kind as described herein is highly advantageous. Typically, all-terrain driving takes place mostly over back-trails which, though rudimentary, do at least constitute a track, and it is possible to maintain reasonable speed along such trails. It has been found that a twenty-kilowatt-engined vehicle, having a steering/transmission system as described herein, and including a CVT between the engine and the engine-shaft 25, performs very well under such conditions. That is to say, it can be expected that, averaged over say a day's travel, the vehicle will have used e.g thirty percent less fuel than the corresponding 20 kW vehicle, having a CVT, that is simply skid-steered.

As suggested, driving an ATV with simple skid-steering can be physically (and mentally) tiring over a period. And, even for the passengers, the jerky manoeuvrings can be tiresome, as can the noise occasioned by the jerking, including the rattling and slapping of chain drives that are undergoing violent stops and starts.

However, simple skid-steering does have advantages. Occasionally, during all-terrain trail driving, a stretch of the trail might be encountered that demands a considerably greater level of drivability from the vehicle and its steering/transmission system. Conventionally-steered and -driven ATVs are generally not able to cope when conditions worsen and the trail becomes e.g a sea of mud, whereby such an ATV becomes bogged down.

A key advantage of skid-steering lies in its enabling a skilled driver to extricate a bogged skid-steered ATV much more readily than a bogged conventionally-steered ATV. And, just as, from the standpoint of extricability, the simple skid-steered ATV is a large step up from a conventionally-steered ATV, so it can be regarded that an ATV equipped with the present steering/transmission system is a large step up from an ATV equipped with simple skid-steering—from the standpoint, again, of ease of extricability, but also, now, from the standpoint of the quiet pleasantness of cruising over the more easily passable stretches of the trails. Thus, the present steering/transmission system can be expected to out-perform a simple skid-steering system both as regards extricability from the most adverse terrains, and as regards ease of cruising over more reasonable terrains.

The system as described offers the driver a degree of delicacy and sensitivity in the steering that is unmatched by other modes of skid-steering available in an under-thirty-kilowatt ATV. The difference is especially advantageous during long periods of trail-driving. And the present system also provides a marked reduction in fuel consumption for such driving, and enables the ATV to be driven comfortably at a higher speed over a rough trail (although this might offset some of the fuel economies). Yet at the same time, the new system permits drivers to extricate their vehicles from situations that would cause other vehicles to become bogged down.

It will be recognised that the system as described has a technological niche in which it is very cost-effective. Very small ATVs, which are suitable for just one person (although sometimes with room for a pillion passenger, as on a motorcycle), are not preferred candidates for the present system, because in those machines sophistication of performance has to be compromised by the need for simplicity and low cost. In those machines, the left wheels are not coupled together with chains or tracks, and the machine is driven and steered conventionally. The small machines do not have extricability, i.e they can become bogged down in slippery conditions rather easily. On a lightweight ATV, this might be of only small consequence, because the machine would be light enough to be (occasionally) picked up and carried. But if a heavier ATV has become bogged down, the only option is to tow it out. Since ATVs are operated on the back trails, well away from ready assistance, resistance to becoming bogged is very important—or, rather, the availability on the vehicle of multiple options for extricating the bogged vehicle, is very important.

Similarly, a heavy industrial or military ATV, typically having an engine of several hundred kilowatts, has its own steering/transmission requirements, which demand degrees of sophistication and complexity in which the simplicity of the present system would be out of place.

Thus, the preferred type of vehicle to which the present system is particularly suited is an ATV in which, first, the wheels on one side are all constrained to rotate as one, e.g by being chained together or e.g by tracks, and preferably the vehicle is one in which steering is done by activating a means for arresting the wheels (usually, all the wheels) on one side. Preferably, the preferred vehicle is so large that, if the vehicle cannot be driven, it basically then cannot be moved by a person. Preferably, the vehicle is of the kind in which two persons can be seated, facing forwards, and side by side, within a passenger compartment of the vehicle. On the other hand, the preferred vehicle is not so large as to need or have an engine that exceeds thirty kilowatts. The following considerations help explain these preferences.

The CVT as combined with the described steering/transmission system, in the ATV, preferably varies automatically in response to the speed of the engine. The driver makes the vehicle move by actuating an accelerator, which causes the speed of the engine to increase. Then, as the speed increases, and the speed of the vehicle increases, so the ratio of the CVT changes. As the ATV picks up from a standing start, the drive ratio between the engine crankshaft speed and the speed of the engine-shaft 23, at first, preferably should be e.g 3:1; then, as the vehicle approaches its top speed, that ratio should change to e.g 0.8:1. (The number below unity indicates over-drive, i.e the engine crankshaft is turning slower than the engine-shaft 23.) An overall change of ratios of less than about 2:1 would be out of place in the context of the present technology. An overall change of ratios of more than about 6:1 would indicate a CVT of rather more sophistication than is probably commercially practicable in the present context.

Alternatively, the CVT may be, or may include, an electric or hydraulic drive. Those CVTs are considerably more expensive, but do generally have a greater range of operational conditions.

Typically, a proprietary CVT unit includes a centrifugal clutch, and a designer of the present system should take advantage of that.

The steering/transmission system as described herein is comparatively compact and lightweight. These advantageous aspects are now considered in more detail.

As mentioned, the present system can be described as a triple-differential system. Of course, the 3-diff arrangement is commonly used in tracked vehicles such as tanks and earth movers. However, the design requirements appropriate to the steering/transmission of a small ATV cannot be met simply by scaling down the steering/transmission of a tank. For example, a continuously-variable transmission is generally out of the question for heavy vehicles, and such large vehicles typically have six or more selectable gear ratios.

A gearbox that has two (HIGH and LOW) selectable gear ratios is, of course, more complex than a gearbox that included no facility for selection (other than FORWARDS and REVERSE). However, a 3-diff gearbox that enables selection only between HIGH and LOW is very much less complex than a 3-diff gearbox that enables selection between six ratios, especially in terms of the required extra shafts, gears, bearings, etc.

In the present gearbox, the components used in the mechanism that enables selection between HIGH and LOW are, largely, identical to the components used in the mechanism that enables selection between FORWARDS and REVERSE. Given that the facility to select between FORWARDS and REVERSE is already provided, such duplication enables the facility to select between just two speed ratios (i.e HIGH and LOW) to be achieved at very little extra cost—certainly when compared with the cost of providing a facility for selecting between larger numbers of ratios, i.e between three or more ratios.

Thus, the following combination is recognized as being very cost-effective, in respect of an ATV in the sub-thirty-kW size: namely, the combination or union of a CVT having a ratio-change range as indicated above, with a gearbox having the facility for change simply between HIGH and LOW. At a power rating of twenty-five or thirty kilowatts, a wide choice of proprietary CVT systems is available. The use of a CVT, in the present design, should not be understood as imposing an upper limit on the power of the vehicle, in that CVTs are available with higher power ratings; rather, the emphasis is that, in sub-thirty-kW vehicles, finding a suitable proprietary CVT poses few problems.

In other 3-diff steering/transmission systems, insofar as such other systems include equivalents of the present wheel-shaft 25 and steer-shaft 27, the left and right steer-braking has been done on the wheel-shafts, not on the steer-shafts. The steer-shafts 27 rotate much faster than the wheel-shafts 25, and it is preferred for the brakes to be placed on the faster shaft—especially since one function of the present brakes is to control steering.

In the described example, the brake-discs 67 are located outside the housing 20, and are separated from the steer-wheel gears 76, which are inside the housing 20, by the steer-shaft-bearings 89. Thus, the brake-discs 67 are mounted on the outboard ends of the steer-shafts 27, which overhang the outboard sides of the steer-shaft-bearings 89; while the steer-wheel-gears 76 are mounted on the inboard ends of the steer-shafts 27, which overhang the inboard sides of the bearings 89. These discs and gears are therefore well supported by the widely-spaced bearing elements of the steer-shaft-bearings 89.

The steer-diff-housing 60 is supported in left and right steer-diff-housing-bearings 94L,94R upon the left and right steer-shafts 27L,27R. It will be understood that, as a result of the particular configuration and arrangement of the described example, support for the steer-shafts 27 is so robust and well-balanced that the steer-shafts themselves can be used, in turn, to provide support for the steer-diff-housing 60, via the steer-diff-housing-bearings 94. That is to say, the designer is able, with advantages, to utilize "floating" the rotating steer-shaft-housing 60 from and between the rotating steer-shafts 27, because the steer-shafts themselves are so well-supported.

It will be understood that similar considerations apply to the left and right wheel-differentials, in the present system. Thus, the wheel-ring 47 floats on the rotating left and right wheel-shafts 25L,25R. That is to say: the wheel-ring 47 is supported by wheel-ring-bearings 96 upon and between the two rotating wheels-shafts 25L,25R, which are themselves supported on respective wheel-shaft-bearings 98L,98R carried by the gearbox housing 20. The elements of the wheel-shaft-bearings 98 are, as can be seen, well-spaced and very robustly supported in the housing 20—so much so that the designer can comfortably take advantage of utilizing floating the wheel-ring 47 from and between the wheel-shafts 25.

Of course, the left wheel-shaft 25L rotates at a different speed from the right wheel-shaft 25R during steering, and the components must be structured to accommodate that fact, while providing the required support. A centre-pin 90 is screwed into the left wheel-shaft, and becomes rigidly unitary therewith. The centre-pin 90 runs in a centre-pin-bearing 92 with respect to the right wheel-shaft 25R. The taper-roller wheel-ring-bearings 96 thus are mounted on the centre-pin 90, rather than directly on the wheel-shafts themselves.

By resorting to what might be called the floating-shafts-within-shafts support system, as described, for the steer-diff-housing 60 and for the wheel-ring 47, the steer/transmission system as a whole is much simplified as a structural unit. If the steer-diff-housing and the wheel-ring had to be supported on bearings which were themselves carried directly by the gearbox-housing, the structure as a whole would have to be considerably widened, and made heavier, and would become significantly more complex. In a gearbox, especially, small increases in size and increased complexity can be regarded as large multipliers of increased cost.

Figure 5:
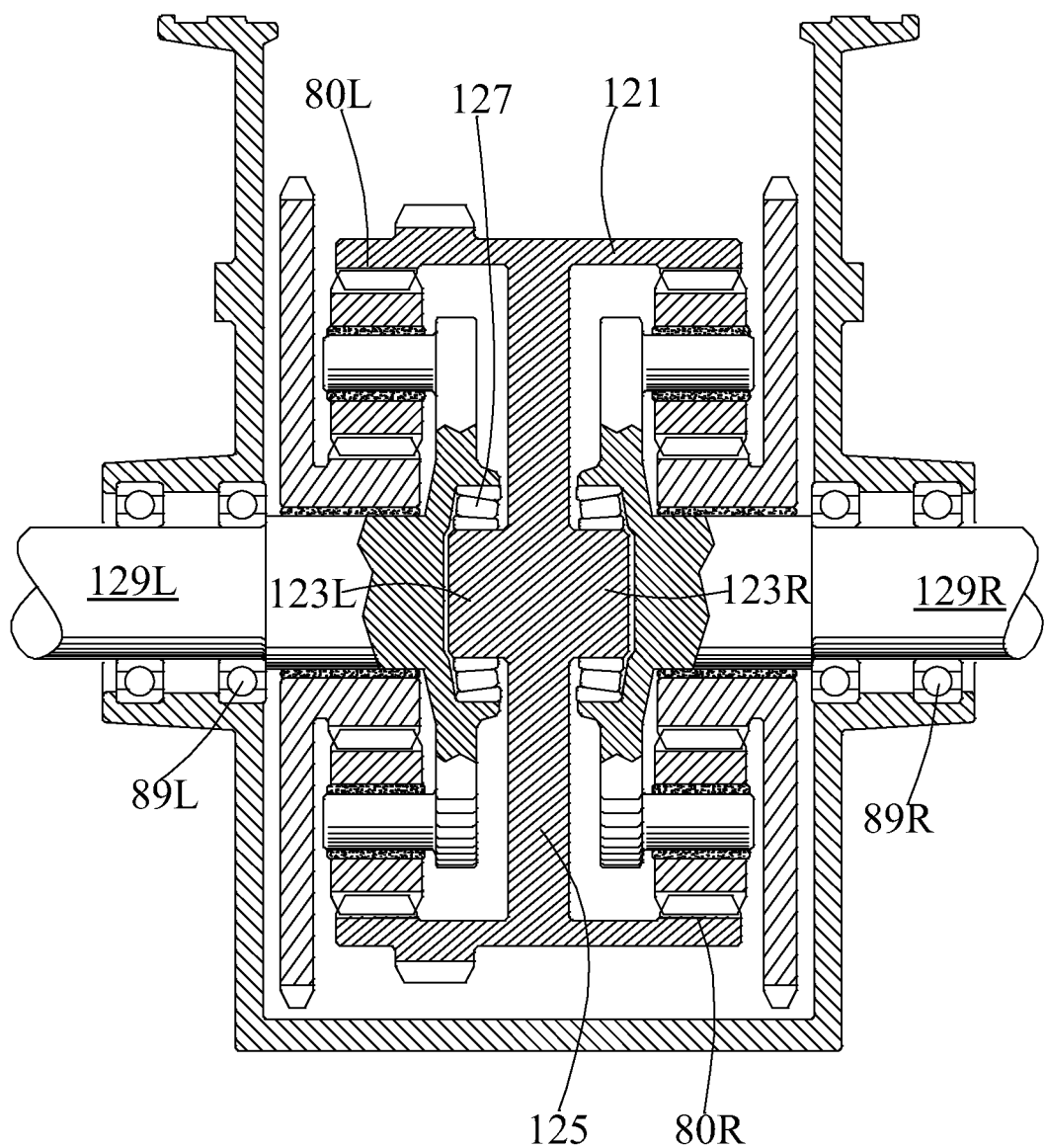
FIG. 5 is a view like that of FIG. 3, showing some component variations.

FIG. 5 shows an alternative manner of supporting the wheel-ring. Here, the centre-pin, fixed into the left wheel-shaft, has been omitted. Now, the wheel-ring 121 is provided with a shaft, or rather with two stub-shafts 123L,123R, which extend left and right from the central plate or disk 125 of the wheel-ring 121. Wheel-ring bearings 127 are provided, which are pressed into recesses in the wheel-shaft components 129L,129R. It will be understood that, in FIG. 5, again, the wheel-ring 121 is "floating" on the (highly robust) wheel-shaft bearings 89L,89R.

The wheel-ring 47; 121 is the most heavily loaded component of the transmission and steering apparatus. The rest of the components in the drive-train can be structured comparatively lightly, in that the power of the engine is transmitted through the other components at a higher speed, and hence smaller torque. Of the drive-train components, only the wheel-ring needs to be large and heavy.

The wheel-ring 47,121 is structured for robustness. The wheel-ring has the basic shape of two open cups, which are integrated together in a back-to-back configuration. The wheel-ring-gears 80L,80R are formed inside the respective cups. The two cups share a common end-wall 125, which has the basic shape of a flat disc. Thus, the shape of the wheel-ring is highly resistant to distortion. Even so, the width of the gearbox at the wheel-shafts 25,129 can be characterized as narrow—an important advantage in an (amphibious) ATV—in which respect an ATV is quite different from other vehicles that utilize an epicyclic steering/drive transmission.

Figure 6:
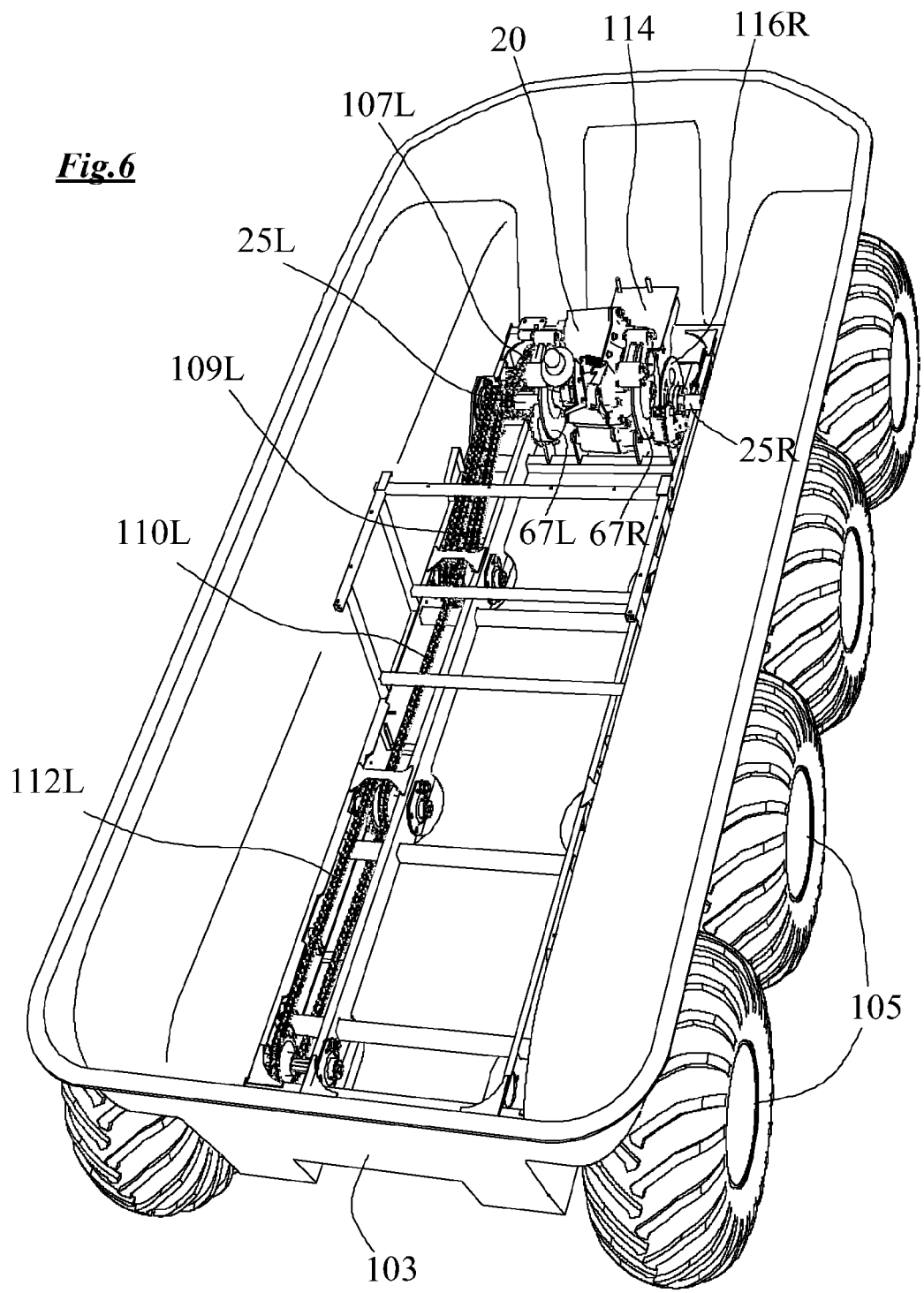
FIG. 6 is a diagram showing the layout of some of the drive and steering components of an ATV.

FIG. 6 is a pictorial view of some components of an ATV, which incorporates a transmission system of the kind described in FIGS. 1-4. The drawing shows the hull 103 of the (amphibious) vehicle, and shows five of the eight road wheels, arranged in four pairs. The left wheel-shaft 25L may be seen. A left fore-chain 107L engages sprockets that are fast with the left wheel-shaft 25L. The fore-chain 107L directly drives the axle of the left-fore road-wheel, the chain sprockets providing a two-to-one ratio between the wheel-shaft 25L and the road-wheel axle. (Thus, when the vehicle is being driven in HIGH mode, unsteered, the overall ratio is such that the road-wheels 105 rotate at just over 60 rpm per 1000 rpm of the engine-shaft 23.)

A mid-fore-chain 109L is also sprocketed to the wheel-shaft 25L, and drives the mid-fore left road-wheel, again at a two-to-one reduction. A mid-aft chain 110L drives the mid-aft road-wheel at one-to-one, and an aft chain 112L drives the aft road-wheel, also at one-to-one.

The chain-drives on the right side mirror those on the left side. Thus, all the left road-wheels are constrained to rotate in unison with each other, as dictated by the driven speed of the left wheel-shaft 25L, and all the right road-wheels are constrained to rotate in unison with each other, driven by the right wheel-shaft 25R.

One of the benefits of skid-steering is that no space allowance need be made in the hull for steering (yaw) pivoting movements of the road-wheels. The available space between the wheels is thus maximized, which is advantageous from the standpoints not only of on-vehicle space generally, but also of flotation. With conventional steering, when eight road-wheels are needed for good traction, as here, probably the need would arise for at least two of the pairs of road-wheels to be steered—which, in addition to taking up premium space, is also complex and expensive. Also, with skid-steering, each drive-axle merely rotates about a fixed axis through the (moulded sheet plastic of the) hull, which is a straightforward sealing design task. (The bounce/rebound suspension movement of the road-wheels is basically as provided by the resilience of the tires.)

The continuously-variable transmission 114 receives motive power from the engine and transmits that power to the engine-shaft 23. The engine is not physically present in FIG. 6, but it is fixed to the CVT 114. In FIG. 6, the two steering brake-discs 67L,67R with their associated calipers are visible, as components of the gearbox housing 20.

It may be noted that, in FIG. 6, further discs and calipers have been provided on the wheel-shafts 25L,25R. These further brakes are used for actually stopping the moving vehicle. The right stopping-disc is shown at 116R. The requirements of the steer-brakes are rather different from those of the stopping-brakes; steer-brakes are subjected generally to relatively light service duty over long periods, whereas the stopping-brakes have to be engineered to bring the vehicle safely to a halt in an emergency. Designing a brake that is capable of these two rather different functions, in the same brake, can lead to unacceptable compromises. (This is not to say that using the same brakes to perform both functions is ruled out—just as it is not ruled out that the designer might wish to provide respective individual stopping-brakes for all the road-wheels.)

One of the characteristics of an ATV is that the tires are much softer than those of ordinary road vehicles, especially when the resilience of the tires provides all the up/down suspension movement. Thus, ATV tires are typically inflated to no more than about eight lbs/sq.in.

As to engine size, as mentioned, an ATV with an engine of more than about thirty kW probably would be at the upper end of the range of applicability of the present transmission/steering system. Above that, the engineering compromises that enable the described cost/space/weight savings in the small sizes would start to become unacceptable.

The turning circle of a vehicle, for present purposes, is defined, for a particular degree of steering, as the circle that would be traced by the centre of gravity of the vehicle, if the vehicle were to make a complete circle, at that degree of steering. The smaller the diameter of that circle, the tighter the turn. The turning circle is what may be termed the theoretical or nominal circle, computed from the gear ratios and the dimensions of the vehicle. A tight turn, in practice, over actual ground, is likely to involve a good deal of tire slippage. Thus a nominal turning circle of e.g 1.5 meters would actually be two meters or more in diameter.

As described, in LOW mode, in the tightest turn, the inside wheel-shaft has a slightly negative speed, i.e the inside road-wheel rotates backwards. That means the centre of the turning circle lies between the road-wheels, just in from the inside wheel. Thus the minimum turning circle, in LOW mode, should be slightly smaller than the distance apart of the road-wheels. (That is to say: the designers should arrange the operative gear ratios in the transmission system to make it so.) Where the track of the vehicle is e.g 122 cm, the designers should arrange the minimum turning circle (as performed with one of the brake-discs at zero speed) preferably to be between e.g 115 cm and 120 cm in diameter. Again, these magnitudes are appropriate to a sub-thirty-kW ATV.

The designers can adjust the amount of backwards-rotation the inside wheel-shaft has during the minimum turn, in LOW mode, by changing the ratios of the gears. Thus, as stated, the wheel-sun-gears 83 have thirty-five teeth; but if this number of teeth were lowered e.g to thirty-three, the wheel-shaft of the inner wheels would be at more or less zero speed during the tightest turn in LOW mode. Similarly, if the number were increased e.g to thirty-seven teeth, the backwards-rotation of the inner wheel-shaft now would be more or less double what it is when the wheel-sun-gear has thirty-five teeth. And, of course, manipulations of the other gear ratios can be made, which would have equivalent effects.

In HIGH mode, again, the minimum turning circle should be neither too high nor too low. If the minimum turning circle were too small, that would mean that in cruising along a reasonable trail, typically the average or usual amount of steering applied to the vehicle would be done with the brake-discs a long way from being fully stopped, which might be wasteful of engine power. The designers should rather prefer that, in HIGH mode, the average or usual amount of steering be only slightly above the tightest possible steering—although, of course, it cannot be too close. Preferably, in a twenty-five-kW vehicle, having a wheel-track of 122 cm, the designers should aim to provide for a minimum turning circle, in HIGH mode, of about 265 cm diameter. The minimum circle would be too small if it were less than about 150 cm diameter; below that, it could be assumed that the designers were evidently not seeking a good compromise between economical cruising, and the ability to manoeuvre around rather tight corners.

Also, the minimum circle probably would be too large if it were greater than about 550 cm; more than that would indicate that the vehicle had been designed for use on ordinary roads and speeds, rather than designed for cruising over ATV trails.

Herein, two shafts or other rotating entities are described as being "in a fixed-ratio relationship" if the gear ratio between them solely dictates the ratio of their relative rotational speed. Thus, two shafts are not in a fixed-ratio relationship:
(a) where the two shafts are relatively-rotatable components of an epicyclic train;
(b) where the two shafts are relatively-rotatable components of a differential;
(c) where the two shafts are relatively-rotatable components of a continuously-variable-speed drive.

The expression is used when the constancy of the ratio remains unaffected by whether or not the vehicle is being steered. Where the speed ratio between two shafts changes during steering manoeuvres of the vehicle, those two shafts are not in a fixed-ratio relationship. However, the fact that the gear ratio of two shafts is capable of being changed (e.g manually) from one fixed ratio to another, as an isolated event, does not prevent the gearing relationship between the two shafts from being described as a fixed-ratio relationship.

Some examples from the gearbox of the drawings are:—
The two wheel-shafts (i.e the left wheel-shaft 25L and the right wheel-shaft 25R) are not in a fixed ratio relationship.
The steer-diff-housing 60 is in a fixed-ratio relationship with the inter-shaft 38.
The steer-diff-housing 60 and the left steer-shaft 27L are not in a fixed-ratio relationship.
The left wheel-sun-gear 83L is in a fixed-ratio relationship with the left steer-shaft 27L.
The wheel-ring 47 is in a fixed-ratio relationship with the engine-shaft 23.

The expression "fixed ratio" means that the ratio does not change during steering. However, it should be noted that, in the case of some of the pairs of rotating entities in the gearbox of the drawings, the fixed ratio does change upon shifting between HIGH mode and LOW mode, and between FORWARD and REVERSE. Thus, in the example, the fixed-ratio in HIGH mode between the intershaft and the steer-diff-housing is different from the fixed-ratio between those two components in LOW mode But their ratio, whether that ratio is derived from HIGH mode or LOW mode, does remain constant so long as the mode remains unchanged.

A "bearing", as that term is used herein, is a device in which an anti-friction means (e.g balls/rollers/needles, or low-friction material) is in direct contact with two races, being an inner race and an outer race. The races are, or are attached rigidly to, respective elements or components of the apparatus, being elements that are capable of rotary movement relative to each other. (One of the elements might be stationary.) Often, the races are attached to their respective elements by being an interference fit therein; but whatever the manner of attachment, the race is said to be integrated into the element insofar as the race functions as if it were formed directly into the element.

A first element and a second element, being capable of rotating relatively, are described herein as having "no direct bearing support", when the bearing arrangement is as follows:

(e) there is no bearing in respect of which one of its races is integral with the first element and the other race is integral with the second element; but, rather,
(a) the first element is integral with one of the races R1B1 of a first bearing B1;
(b) the other race R2B1 of the first bearing B1 is integral with an intermediate element;
(c) one of the races R1B2 of a second bearing B2 is also integral with the intermediate element; and
(d) the other race R2B2 of the second bearing B2 is integral with the second element.

Some of the components and features in the drawings have been given numerals with letter suffixes, which indicate left or right versions of the components. The numeral without the suffix is used herein to indicate the component generically.

Terms of orientation (e.g "left", "right", etc) when used herein are intended to be construed as follows. The terms being applied to an apparatus, that apparatus is distinguished by the terms of orientation only if there is not one single orientation into which the apparatus, or an image or mirror image thereof, can be placed, in which the terms can be applied consistently.

The accompanying drawings are diagrammatic. In respect of some of the components that are shown monolithically, for ease of explanation of complex operation, of course the designer would see to it that the components are divided up into two or more elements, for ease of manufacturing or assembly purposes.

Herein, the term "unitary" is used to refer to two components which, during operation, perform as if they had been manufactured monolithically, although the components may be separable or dismantlable, e.g for manufacturing or assembly or servicing reasons.

The scope of the patent protection sought herein is defined by the accompanying claims. The apparatuses and procedures shown in the accompanying drawings and described herein are examples.

The numerals used in the accompanying drawings can be summarized as:—
20 transmission housing
21 for/rev shift-rod
22 for/rev shift-fork
23 engine-shaft
24 reverse-idler-shaft
25L,R wheel-shafts
27L,R steer-shafts
30 engine-for-gear
32 engine-rev-gear
34 for/rev selector-sleeve
36 inter-for-gear
38 inter-shaft
40 rev-idler-gear
43 inter-rev-gear=inter-drive-gear
45 wheel-drive-gear
47 wheel-ring
50 inter-high-gear
52 inter-low-gear
53 hi/lo shift-fork
54 hi/lo selector-sleeve
55 hi/lo shift-rod
56 steer-diff
58 steer-high-gear
60 steer-diff-housing
63 steer-low-gear
67L,R brake-discs
69L,R steer-sun-gears
70L,R steer-planet-spindles
72L,R steer-planet-gears
74 line indicating steer-planet-gears 72 are in mesh
76L,R steer-wheel-gears
78L,R wheel-steer-gears
80L,R wheel-ring-gears
83L,R wheel-sun-gears
84 wheel-planet-gears
85L,R wheel-spiders
89L,R steer-shaft-bearings
90 centre-pin
92 centre-pin-bearing
94L,R steer-diff-housing-bearings
96 wheel-ring-bearings
98L,R wheel-shaft-bearings
103 hull
105 road-wheels
107L fore-chain
109L mid-fore-chain
110L mid-aft-chain
112L aft-chain
114 continuously-variable transmission (CVT)
116R stopping-brake disk
121 wheel-ring (FIG. 5)
123L,R stub-shafts on 121
125 central plate or disk of 121
127L,R wheel-ring bearings
129L,R wheel-shafts.

The invention claimed is:

1. A triple-differential drive transmission and steering apparatus for a vehicle, wherein:
   [2] the apparatus includes a non-rotating gearbox housing;
   [3] the apparatus includes an engine-shaft, which is arranged to receive motive power from an engine of the vehicle;
   [4] the apparatus includes left and right wheel-shafts, which are arranged for transmitting motive power respectively to left and right road-wheels of the vehicle;
   [5] the apparatus includes a steer differential, and left and right wheel-differentials;
   [6] the steer-differential includes a steer-diff-housing, and left and right steer-shafts;
   [7] the left and right steer-shafts are geared to each other, and to the steer-diff-housing, in such manner that the sum of the rotary speeds of the two steer-shafts equals twice the rotary speed of the steer-diff-housing;
   [8] the apparatus includes a left steer-brake, which is operable to retard rotation of the left steer-shaft;
   [9] the apparatus includes a right steer-brake, which is operable to retard rotation of the right steer-shaft;
   [10] the steer-diff-housing is in fixed-ratio relationship with the engine-shaft;
   [11] the left and right wheel-differentials include respective left and right wheel-sun-gears, wheel-planet-gears, wheel-spiders, and wheel-ring-gears, arranged as respective left and right epicyclic gearsets;
   [12] the left wheel-spider is unitary with the left wheel-shaft;
   [13] the right wheel-spider is unitary with the right wheel-shaft;
   [14] the left wheel-sun-gear is in fixed-ratio relationship with the left steer-shaft;
   [15] the right wheel-sun-gear is in fixed-ratio relationship with the right steer-shaft;
   [16] the left wheel-ring-gear is in fixed-ratio relationship with the engine-shaft; and
   [17] the right wheel-ring-gear is in fixed-ratio relationship with the engine-shaft.

2. As in claim 1, wherein:
[2] the apparatus includes a common wheel-ring;
[3] the left wheel-ring-gear is unitary with the common wheel-ring;
[4] the right wheel-ring-gear is unitary with the common wheel-ring;
[5] the left and right wheel-ring-gears are in fixed-ratio relationship with the engine-shaft in that a wheel-drive-gear of the common wheel-ring is in fixed-ratio relationship with the engine-shaft.

3. As in claim 2, wherein:
[2] the common wheel-ring is a unitary structure, having the basic shape of left and right open cups, which are integrated together in a back-to-back configuration;
[3] the left wheel-ring-gear is formed in the left cup, and the right wheel-ring-gear is formed in the right cup;
[4] the left cup includes a basically cylindrical left annulus in which the left wheel-ring is formed internally;
[5] the right cup comprises a basically cylindrical right annulus in which the right wheel-ring is formed internally;
[6] the two cups share a common end-wall;
[7] the end-wall has the basic shape of a flat disc;
[8] the left annulus protrudes axially to the left of the common end-wall; and
[9] the right annulus protrudes axially to the right of the common end-wall;
[10] the wheel-drive-gear is formed on an outer surface of one of the annuluses.

4. As in claim 2 wherein:
[2] the apparatus includes left and right wheel-shaft bearings, and includes a wheel-ring bearing;
[3] one race of the left wheel-shaft bearing is integral with the left wheel-shaft, and the other race is integral with the gearbox housing;
[4] one race of the wheel-ring bearing is integral with the common wheel-ring, and the other race is integral with the left wheel-shaft;
[5] the common wheel-ring has no direct bearing support from the gearbox housing, in that the apparatus is absent any bearing in respect of which one of its races is integral with the wheel-ring and the other race is integral with the gearbox housing.

5. As in claim 1, wherein:
[2] the apparatus includes a centre-pin, which is integrated into one of the wheel-shafts;
[3] the apparatus includes a centre-pin bearing; and
[4] one race of the centre-pin bearing is integral with the centre-pin, and the other race is integral with the other of the wheel-shafts.

6. As in claim 1, wherein the left steer-shaft has a unitary left brake-disc, and the right steer-shaft has a unitary right brake-disc.

7. As in claim 1, wherein:
[2] the left steer-brake includes a left rotary element, and includes a left stationary element;
[3] the left rotary element of the left steer-brake is integrated into the left steer-shaft;
[4] the apparatus includes a left steer-shaft bearing;
[5] one race of the left steer shaft-bearing is integral with the steer-shaft, and the other race is integral with the gearbox housing;
[6] the right steer-brake includes a right rotary element, and includes a right stationary element;
[7] the right rotary element of the right steer-brake is integrated into the right steer-shaft;
[8] the apparatus includes a right steer-shaft bearing;
[9] one race of the right steer shaft bearing is integral with the steer-shaft, and the other race is integral with the gearbox housing; and
[10] the left rotary and stationary elements of the left steer-brake, and the right rotary and stationary elements of the right steer-brake, are located outside the gearbox housing.

8. As in claim 7, wherein:
[2] one race of the left steer-shaft bearing is integral with the steer-shaft, and the other race is integral with the gearbox housing;
[3] one race of the right steer-shaft bearing is integral with the steer-shaft, and the other race is integral with the gearbox housing;
[4] the steer-diff-housing has no direct bearing support from the gearbox housing, in that:
[5] (a) the apparatus is absent any bearing in respect of which one of its races is integral with the steer-diff-housing and the other race is integral with the gearbox housing;
[6] (b) one race of a left diff-housing bearing is integral with the steer-diff-housing, and the other race is integral with the left steer-shaft; and
[7] (c) one race of a right diff-housing bearing is integral with the steer-diff-housing, and the other race is integral with the right steer-shaft.

9. As in claim 1, wherein:
[2] the apparatus is a component of an all-terrain vehicle (ATV);
[3] the ATV has N road-wheels on the left side of the vehicle, and N road-wheels on the right side of the vehicle, where N is two or more;
[4] the structure of the ATV is such that none of the N left road-wheels nor the N right road-wheels of the vehicle is able to undergo steering movement, being pivoting movement of the road-wheel about an axis parallel to a yaw-axis of the vehicle;
[5] the structure of the ATV is such as to constrain all N right road-wheels to rotate only at the same speed as each other; and
[6] the structure of the ATV is such as to constrain all N left road-wheels to rotate only at the same speed as each other.

10. As in claim 9, wherein:
[2] the road-wheels of the ATV have pneumatic tires;
[3] the tires are soft, being inflated to a pressure of no more than about eight psi; and
[4] the ATV is amphibious, having a watertight hull.

11. As in claim 9, wherein:
[2] the ATV includes the engine, and includes a continuously-variable-transmission (CVT);
[3] the CVT is operatively interposed between a crankshaft of the engine and the said engine-shaft;
[4] the CVT has a range of ratios, ranging from a highest ratio to a lowest ratio;
[5] the highest ratio of the CVT is at least twice the lowest ratio; and
[6] the highest ratio of the CVT is no more than about six times the lowest ratio.

12. As in claim 1, wherein:
[2] the apparatus includes a sequential drive train, comprising those components through which power is transmitted from the engine-shaft through to the left and right wheel-shafts;
[3] the apparatus includes a forward/reverse shift-change mechanism and a high/low shift-change mechanism, both of which are components of the drive train;

[4] included in the drive train are the steer-differential and the left and right wheel-differentials;

[5] both the forward/reverse shift-change mechanism and the high/low shift-change mechanism are located upstream of, being functionally closer to the engine-shaft than, the steer-differential;

[6] whereby torques and forces within the mechanisms are smaller than they would be if the mechanisms were located, in the drive train, downstream of the steer-differential.

13. As in claim 1, wherein:

[2] the apparatus includes a manually-operable high/low shift-change mechanism;

[3] the steer-diff-housing being in a fixed-ratio relationship with the engine-shaft, the high/low shift-change mechanism is effective, when operated, to change that fixed-ratio from a high fixed-ratio to a low fixed-ratio;

[4] the steer-diff-housing being in fixed-ratio relationship with the engine-shaft, the structure of the apparatus is such that that fixed-ratio relationship can be set to two, and only two, fixed ratios, namely a high fixed-ratio and a low fixed-ratio;

[5] the wheel-ring being in a fixed-ratio relationship with the engine-shaft, the apparatus is so arranged that the fixed-ratio remains unchanged when the fixed-ratio of the engine-shaft to the steer-diff-casing changes from the high fixed-ratio to the low fixed-ratio.

14. As in claim 13, wherein:

[2] the apparatus includes a manually-operable forward/reverse shift-change mechanism;

[3] the forward-reverse shift-change mechanism is effective, when operated, both to change the rotational sense of the steer-diff-housing, and to change the rotational sense of the wheel-ring.

15. As in claim 13, wherein the gear ratios are so arranged that:

[2] (a) the high/low shift-change mechanism being operated to the high fixed-ratio;

[3] (b) the left steer-shaft being braked to a complete rotary stop;

[4] (c) the right steer-shaft being unbraked;

[5] both wheel-shafts then rotate with forwards velocity; and

[6] (a) the high/low shift-change mechanism being operated to the low fixed-ratio;

[7] (b) the left steer-shaft being braked to a complete rotary stop;

[8] (c) the right steer-shaft being unbraked;

[9] the left wheel-shaft rotates with forwards velocity, but the right wheel-shaft rotates with backwards velocity.

16. As in claim 15, wherein the gear ratios are so configured that, when the high/low shift-change mechanism is operated to the low fixed-ratio, the minimum steering radius of the vehicle is considerably tighter than when the high/low shift-change mechanism is operated to the high fixed-ratio.

17. As in claim 1, wherein:

[2] the apparatus includes a forward/reverse shift-change mechanism, which includes a for/rev shift-rod;

[3] the apparatus includes a high/low shift-change mechanism, which includes a hi/lo shift-rod;

[4] the two shift-rods are mounted in a parallel side-by-side relationship in the apparatus;

[5] respective distal ends of the two shift-rods are housed in and supported by sockets in a reverse-idler-shaft of the apparatus.

18. Drive transmission and steering apparatus for a vehicle, wherein:

[2] the apparatus includes a gearbox housing;

[3] the apparatus includes an engine-shaft, which is arranged to receive motive power from an engine of the vehicle;

[4] the apparatus includes left and right wheel-shafts, which are arranged for transmitting motive power respectively to left and right road-wheels of the vehicle;

[5] the apparatus includes independently operable left and right steer-brakes, which are effective, when operated, to retard rotation of the respective wheel-shafts;

[6] the apparatus includes left and right wheel-differentials, having respective left and right wheel-sun-, wheel-planet-, and wheel-ring-gears;

[7] the left and right wheel-planet-gears are carried on respective left and right wheel-spiders;

[8] the left wheel-spider is unitary with the left wheel-shaft, and the right wheel-spider is unitary with the right wheel-shaft;

[9] the apparatus includes a wheel-drive-gear, which is in a fixed-ratio relationship with the engine-shaft;

[10] the apparatus includes a steer-differential, having a steer-diff-housing, and having left and right steer-shafts, and the structure of the steer-differential is such that the steer-shafts can rotate at different speeds;

[11] the left steer-shaft includes a left steer-wheel-gear, and the right steer-shaft includes a right steer-wheel-gear;

[12] the left wheel-sun-gear is in fixed-ratio relationship with the left steer-wheel-gear, and the right wheel-sun-gear is in fixed-ratio relationship with the right steer-wheel-gear;

[13] the left steer-wheel-gear is in fixed-ratio relationship with the left wheel-steer-gear, and the right steer-wheel-gear is in fixed-ratio relationship with the right wheel-steer-gear;

[14] the left and right wheel-ring-gears are components of a common wheel-ring, in which are formed the left and right wheel-ring-gears, and the wheel-drive-gear is integral with the common wheel-ring;

[15] the apparatus includes a sequential drive train, comprising those components through which power is transmitted from the engine-shaft through to the left and right wheel-shafts;

[16] included in the drive train are the steer-differential and the left and right wheel-differentials;

[17] the apparatus includes a forward/reverse shift-change mechanism and a high/low shift-change mechanism, both of which are components of the drive train;

[18] of the two mechanisms, the high/low shift-change mechanism is located downstream of the forward/reverse shift-change mechanism, the forward/reverse shift-change mechanism being functionally the closer, in the drive-train, to the engine-shaft.

19. A triple-differential drive transmission and steering apparatus for a vehicle, wherein:

[2] the three differentials of the apparatus comprise a steering-differential, and left and right wheel-differentials;

[3] the steering-differential includes a rotating steer-diff-casing;

[4] the left wheel-differential and the right wheel-differential include a rotating common wheel-ring;

[5] the steer-diff-casing and the common wheel-ring are geared together in fixed-ratio relationship with each other.

\* \* \* \* \*